US012572149B2

(12) United States Patent　　　　(10) Patent No.: US 12,572,149 B2
Takahashi　　　　　　　　　　　　(45) Date of Patent: Mar. 10, 2026

(54) CONTROL SYSTEM, CONTROL METHOD, AND STORAGE MEDIUM OF PLURALITY OF AUTONOMOUS MOBILE OBJECTS

(71) Applicant: TOYOTA JIDOSHA KABUSHIKI KAISHA, Toyota (JP)

(72) Inventor: Masahiro Takahashi, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 317 days.

(21) Appl. No.: 18/166,653

(22) Filed: Feb. 9, 2023

(65) Prior Publication Data

US 2023/0350425 A1　　　Nov. 2, 2023

(30) Foreign Application Priority Data

Apr. 28, 2022　(JP) ................................. 2022-074865

(51) Int. Cl.
G05D 1/00　　　　　(2024.01)
(52) U.S. Cl.
CPC .................................. G05D 1/0293 (2013.01)
(58) Field of Classification Search
CPC ........................... G05D 1/0293; G05D 1/0291
See application file for complete search history.

(56) References Cited

U.S. PATENT DOCUMENTS

| 2017/0270785 A1* | 9/2017 | Umehara | ................. G08G 1/08 |
| 2019/0250639 A1* | 8/2019 | Xu | ........................ G08G 1/0145 |
| 2020/0294394 A1* | 9/2020 | Guo | ................ G08G 1/096783 |
| 2020/0372805 A1* | 11/2020 | Kim | ........................ B60L 58/12 |
| 2021/0056840 A1* | 2/2021 | Yamazaki | .............. G08G 1/095 |
| 2021/0120185 A1 | 4/2021 | Etou et al. | |
| 2021/0188594 A1* | 6/2021 | Hsu | ........................ B66B 1/3407 |

FOREIGN PATENT DOCUMENTS

JP　　　　2021-068974 A　　　4/2021

* cited by examiner

*Primary Examiner* — Anne Marie Antonucci
*Assistant Examiner* — Wesam Almadhrhi
(74) *Attorney, Agent, or Firm* — Oliff PLC

(57) ABSTRACT

A control system for a plurality of autonomous mobile objects according to the present disclosure includes a dividing element identifying unit and a movement control unit. A dividing element is arranged on the route. The dividing element decouples the group by passing at least one preceding autonomous mobile object of the group and stopping at least one subsequent autonomous mobile object when the plurality of autonomous mobile objects follow the departure point from the route to the destination point in the group. The dividing element identifying unit specifies a dividing element. The movement control unit controls the movement of the plurality of autonomous mobile objects so as to reduce the waiting time for stopping at least one autonomous mobile object followed by the dividing element in accordance with the dividing element specified by the dividing element identifying unit.

13 Claims, 19 Drawing Sheets

CONTROL SYSTEM, CONTROL METHOD, AND STORAGE MEDIUM OF PLURALITY OF AUTONOMOUS MOBILE OBJECTS

CROSS-REFERENCE TO RELATED APPLICATION

This application claims priority to Japanese Patent Application No. 2022-074865 filed on Apr. 28, 2022, incorporated herein by reference in its entirety.

BACKGROUND

1. Technical Field

The present disclosure relates to a control system, a control method, and a storage medium of a plurality of autonomous mobile objects.

2. Description of Related Art

In an autonomous mobile control system disclosed in Japanese Unexamined Patent Application Publication No. 2021-068974 (JP 2021-068974 A), a plurality of autonomous mobile objects execute their own tasks.

SUMMARY

The present inventors have found the following problems. Such a control system may be used to autonomously move the autonomous mobile objects in a group along a route to a destination. In such a case, the dividing element is disposed in the route and the dividing element divide the group. In particular, the dividing element divides the group into at least one preceding autonomous mobile object and at least one subsequent autonomous mobile object. The dividing element causes at least one preceding autonomous mobile object to pass while stopping at least one subsequent autonomous mobile object. Since at least one subsequent autonomous mobile object waits by the dividing element, waiting time occurs.

The present disclosure provides a control system, a control method, and a control program of a plurality of autonomous mobile objects that can reduce waiting time of the autonomous mobile objects.

A control system of a plurality of autonomous mobile objects according to the present disclosure is a control system of a plurality of autonomous mobile objects that is able to autonomously move in a group from a departure point to a destination point along a route, the control system including: a dividing element identifying unit; and a movement control unit, in which a dividing element is disposed on the route, in which when the autonomous mobile objects autonomously move in the group from the departure point to the destination point along the route, the dividing element makes at least one preceding autonomous mobile object among the group to pass through, stops at least one subsequent autonomous mobile object, and divides the group, in which the dividing element identifying unit identifies the dividing element, and in which the movement control unit controls movement of the autonomous mobile objects so as to reduce a waiting time for the dividing element to make the at least one subsequent autonomous mobile object stop in accordance with the dividing element specified by the dividing element identifying unit.

According to such a configuration, the dividing element identifying unit identifies the dividing element, and the movement control unit controls movement of the autonomous mobile objects to reduce the waiting time of at least one subsequent autonomous mobile object.

Further, a characteristic may be such that the movement control unit controls movement of the autonomous mobile objects so as to make the at least one subsequent autonomous mobile object to start autonomously moving from the departure point at a time point at which a predetermined period has passed, from a time point at which the movement control unit makes at least the one preceding autonomous mobile object start autonomously moving from the departure point.

According to such a configuration, the at least one subsequent autonomous mobile object starts autonomously moving from the departure point after being delayed from the at least one preceding autonomous mobile object. Therefore, the waiting time of the at least one subsequent autonomous mobile object is reduced.

Further, a characteristic may be such that provided is the passable number calculating unit that obtains the number of the autonomous mobile objects that are able to pass through the dividing element at once, in which when the dividing element divides the group at predetermined time intervals, based on a passable duration in which one of the autonomous mobile objects is able to pass through the dividing element, a distance of a passing section in the dividing element, a moving speed of the autonomous mobile object, and a shape of the group.

According to such a configuration, it is possible to determine the number of autonomous mobile objects configuring the at least one preceding autonomous mobile object and the at least one succeeding autonomous mobile object, based on the number of the autonomous mobile objects that are able to pass through the dividing element at once.

Further, a characteristic may be such that provided is a storable number calculating unit that obtains the number of the autonomous mobile objects that are able to be stored in the storage space at once, based on a size of the storage space, a size of the autonomous mobile object, and a shape of the group, when the dividing element divides the group for each storage space.

According to such a configuration, it is possible to determine the number of the autonomous mobile objects configuring the at least one preceding autonomous mobile object and the at least one succeeding autonomous mobile object, based on the number of the autonomous mobile objects that are able to be stored in the storage space at once.

Further, a characteristic may be such that the movement control unit controls movement of the autonomous mobile objects such that the number of autonomous mobile objects configuring the at least one preceding autonomous mobile object and the at least one subsequent autonomous mobile object is equal to or less than the number of the autonomous mobile objects that are able to pass through the dividing element at once.

According to such a configuration, the at least one preceding autonomous mobile object and the at least one succeeding autonomous mobile object are each able to pass through the dividing element at once.

Further, a characteristic may be such that the movement control unit controls movement of the autonomous mobile objects such that the number of the autonomous mobile objects configuring the at least one preceding autonomous mobile object and the at least one subsequent autonomous mobile object is equal to or less than the number of the autonomous mobile objects that the dividing element is able to store at once in the storage space.

According to such a configuration, the dividing element stores each of the at least one preceding autonomous mobile object and the at least one succeeding autonomous mobile object at once. Thus, the at least one preceding autonomous mobile object and the at least one subsequent autonomous mobile object can smoothly pass the dividing element.

Further, a characteristic may be such that the movement control unit controls movement of the autonomous mobile objects so as to allocate, to the at least one preceding autonomous mobile object, the autonomous mobile objects from the group, in an order in which a remaining amount of a battery is low.

According to this configuration, it is possible to suppress each of the batteries of the at least one preceding autonomous mobile object and the at least one succeeding autonomous mobile object from being completely discharged. The at least one preceding autonomous mobile object and the at least one succeeding autonomous mobile object can perform stable autonomous movement by suppressing each of the batteries from being completely discharged.

Further, a characteristic may be such that the predetermined period is a sum of a passable duration in which one of the autonomous mobile objects is able to pass through the dividing element and a non-passable duration in which the autonomous mobile object is not able to pass through the dividing element.

According to such a configuration, the at least one subsequent autonomous mobile object can pass through the dividing element with almost no stop. There is almost no waiting time for the autonomous mobile objects.

A control method of a plurality of autonomous mobile objects according to the present disclosure is a control method of a plurality of autonomous mobile objects that is executed in a control system of the autonomous mobile objects that are able to autonomously move in a group from a departure point to a destination point, the control method along a route, the control method including: a step in which a dividing element makes at least one preceding autonomous mobile object among the group pass through, makes at least one subsequent autonomous mobile object stop, and divides the group, when the dividing element is disposed on the route and the autonomous mobile objects autonomously move in the group from the departure point to the destination point along the route, and in which the dividing element is identified; and a step that controls movement of the autonomous mobile objects such that the dividing element reduces a waiting time during which the dividing element stops the at least one subsequent autonomous mobile object in accordance with the identified dividing element.

According to such a configuration, the dividing element is identified, movement of the autonomous mobile objects is controlled, and the waiting time of at least one subsequent autonomous mobile object is reduced.

A storage medium according to the present disclosure stores a control program of a plurality of autonomous mobile objects that causes a computer that operates as a control device in a control system of the autonomous mobile objects that are able to autonomously move in a group from a departure point to a destination point along a route to execute: a step in which a dividing element makes at least one preceding autonomous mobile object among the group pass through, makes at least one subsequent autonomous mobile object stop, and divides the group, when the dividing element is disposed on the route and the autonomous mobile objects autonomously move in the group from the departure point to the destination point along the route, and in which the dividing element is identified; and a step that controls movement of the autonomous mobile objects such that the dividing element reduces a waiting time during which the dividing element stops the at least one subsequent autonomous mobile object in accordance with the identified dividing element.

According to such a configuration, the dividing element is identified, movement of the autonomous mobile objects is controlled, and the waiting time of at least one subsequent autonomous mobile object is reduced.

According to the present disclosure, it is possible to reduce the waiting time of the autonomous mobile object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a schematic diagram illustrating an operation example of a control system for a plurality of autonomous mobile objects according to Embodiment 2;

FIG. 8 is a schematic diagram illustrating an operation example of a control system for a plurality of autonomous mobile objects according to Embodiment 2;

FIG. 9 is a schematic diagram illustrating an operation example of a control system for a plurality of autonomous mobile objects according to Embodiment 2;

FIG. 13 is a schematic diagram illustrating another operation example of a control system for a plurality of autonomous mobile objects according to Embodiment 2;

FIG. 14 is a schematic diagram illustrating another operation example of a control system for a plurality of autonomous mobile objects according to Embodiment 2;

FIG. 15 is a schematic diagram illustrating another operation example of a control system for a plurality of autonomous mobile objects according to Embodiment 2;

FIG. 16 is a schematic diagram illustrating another operation example of a control system for a plurality of autonomous mobile objects according to Embodiment 2;

DETAILED DESCRIPTION OF EMBODIMENTS

Hereinafter, specific embodiments to which the present disclosure is applied will be described in detail with reference to the drawings. However, the present disclosure is not limited to the following embodiments. Further, in order to clarify the explanation, the following description and drawings have been simplified as appropriate. It should be understood that the right-hand xyz co-ordinates shown in FIG. 6 and the remaining drawings are for convenience of describing the positional relation of the constituent elements. Normally, the positive direction of the z-axis is vertically upward and xy plane is a horizontal plane, which is the same among the drawings. In addition, the positive direction of the x-axis is a direction from the departure point toward the destination point.

Embodiment 1

A control system according to Embodiment 1 will be described with reference to FIG. 1.

Figure 1:
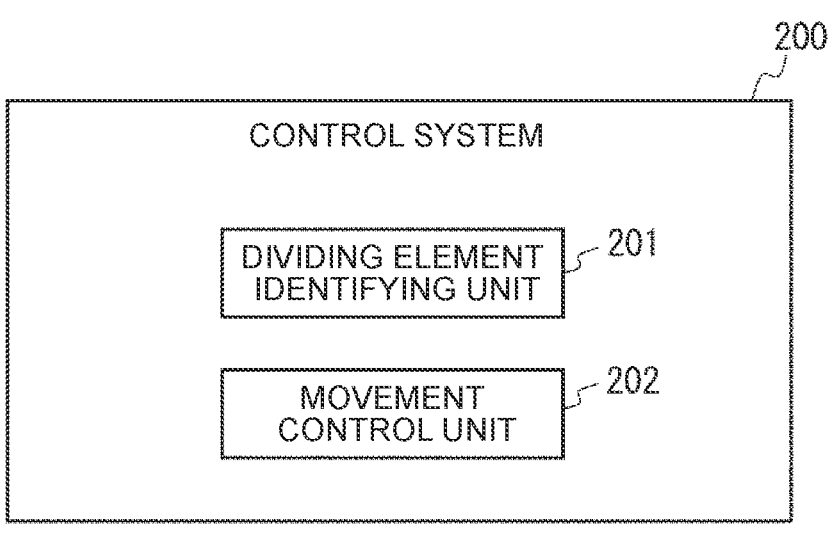
FIG. 1 is a block diagram illustrating a configuration example of a control system for a plurality of autonomous mobile objects according to Embodiment 1.

The control system 200 illustrated in FIG. 1 controls a plurality of autonomous mobile objects that can be moved autonomously by a group from a departure point to a destination point along a route. The control system 200 includes a dividing element identifying unit 201 and a movement control unit 202.

Dividing elements are arranged on the path. When the plurality of autonomous mobile objects autonomously move from the departure point to the destination point in the group, the dividing element passes through at least one autonomous mobile object preceding the group and stops at least one autonomous mobile object following the group. This causes the dividing element to disrupt the group.

The dividing element identifying unit 201 specifies a dividing element. The movement control unit 202 controls the movement of the plurality of autonomous mobile objects so as to reduce the waiting time for stopping at least one autonomous mobile object followed by the dividing element in accordance with the dividing element specified by the dividing element identifying unit 201.

As described above, according to such a configuration, the movement control unit 202 controls the movement of the plurality of autonomous mobile objects in accordance with the dividing element specified by the dividing element identifying unit 201, and reduces the waiting time of at least one of the following autonomous mobile objects.

Embodiment 2

Figure 2:
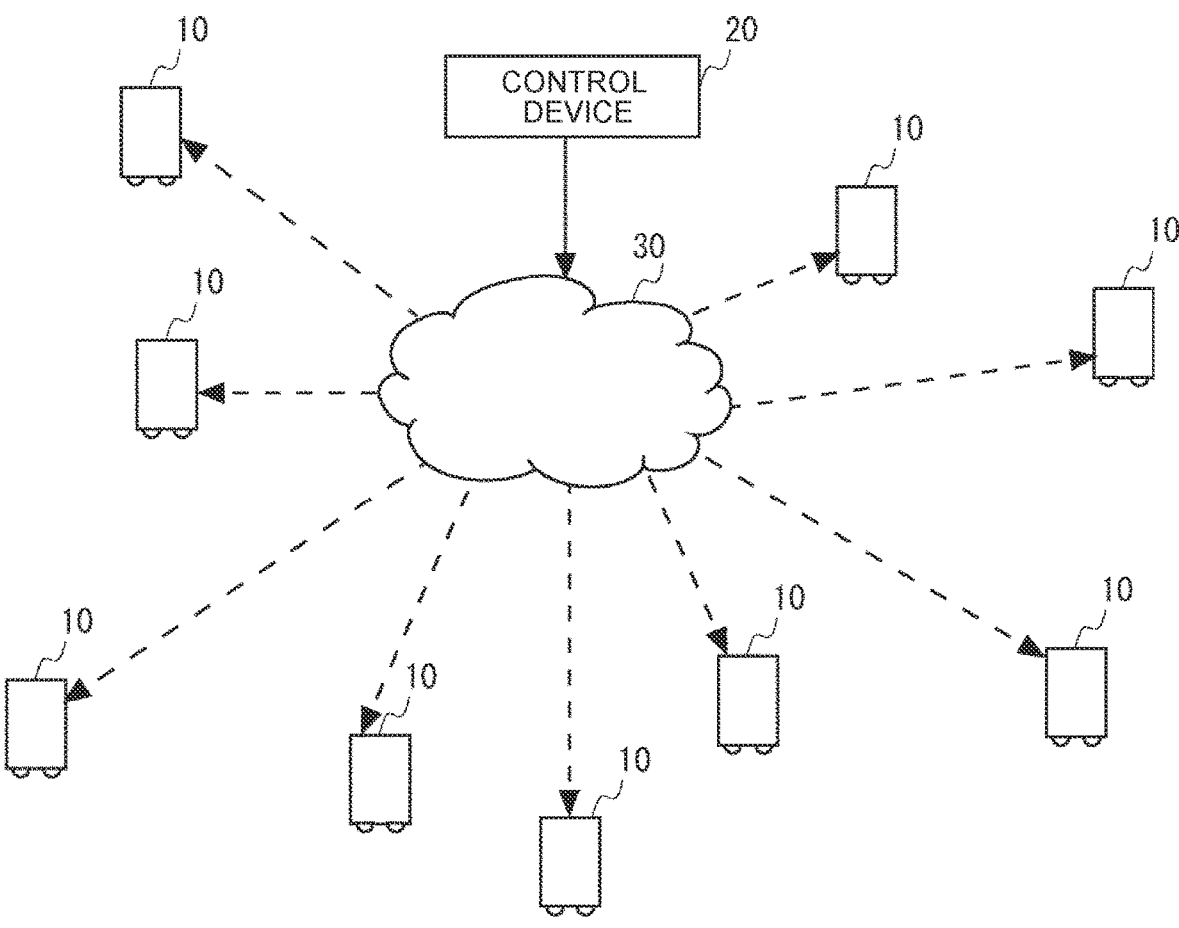
FIG. 2 is a schematic diagram illustrating a hardware configuration of a control system for a plurality of autonomous mobile objects according to Embodiment 2.
Figure 3:
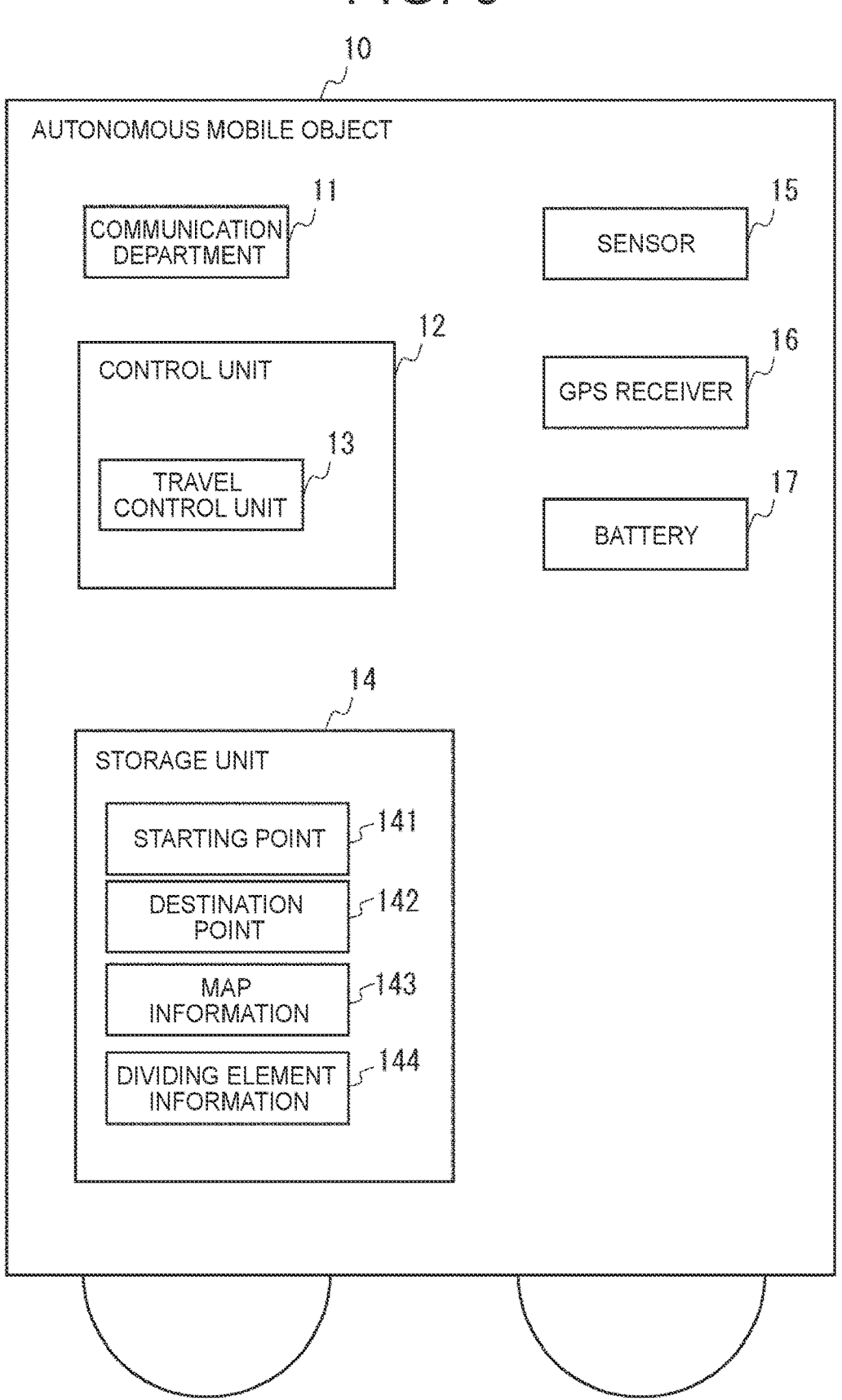
FIG. 3 is a block diagram illustrating a configuration example of a control device according to Embodiment 2.
Figure 4:
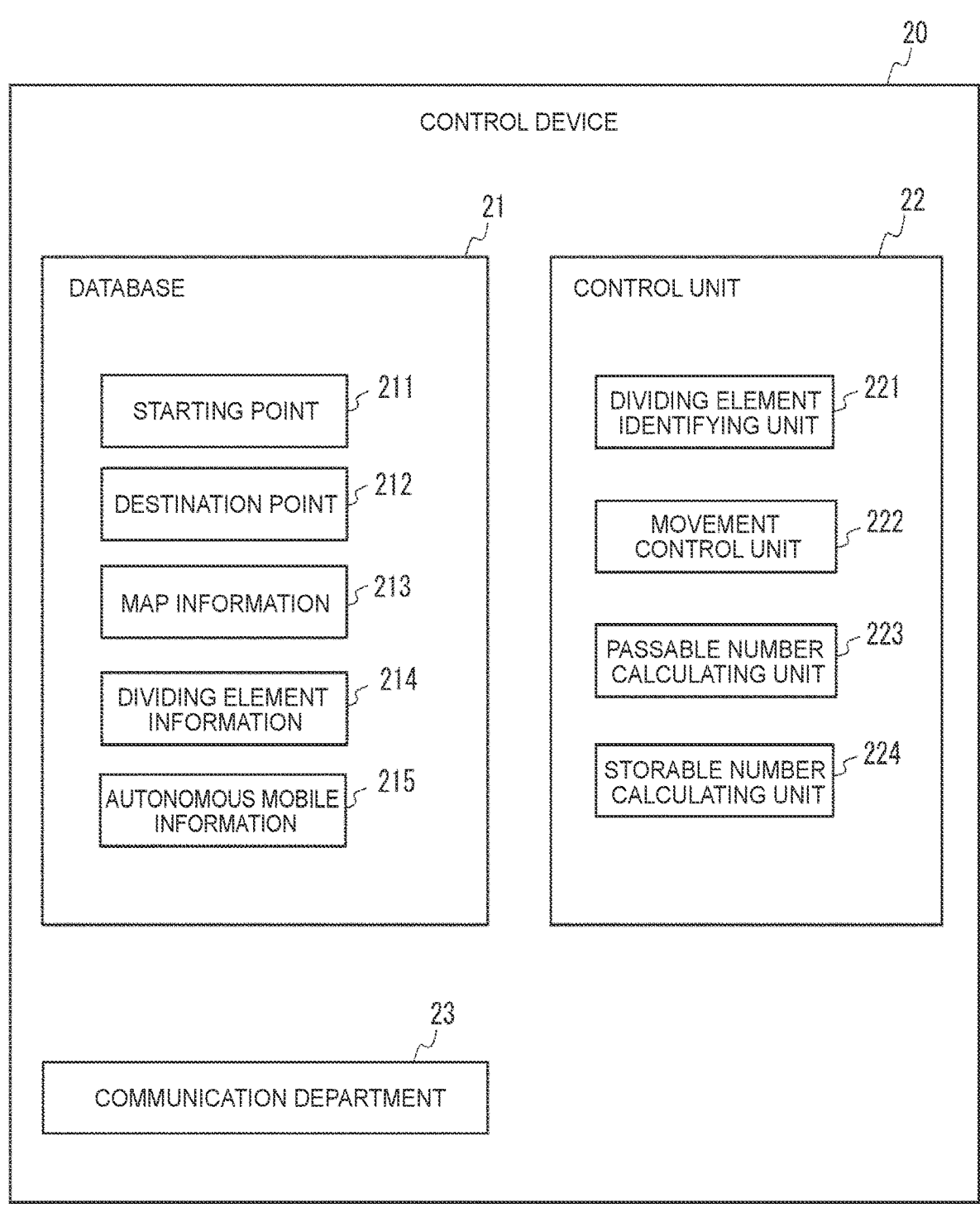
FIG. 4 is a block diagram illustrating a configuration example of an autonomous mobile object according to Embodiment 2.

Referring to FIGS. 2 to 4, a control system according to a second embodiment will be described.

As illustrated in FIG. 2, the control system 100 includes a plurality of autonomous mobile objects 10 and a control device 20. The plurality of autonomous mobile objects 10 and the control device 20 are connected to each other via a network 30. Here, the network 30 is a communication line network such as the Internet, an intranet, a mobile telephone network, and a Local Area Network (LAN.

The plurality of autonomous mobile objects 10 can perform autonomous movement in a group from a departure point to a destination point following a route.

At the departure point, the plurality of autonomous mobile objects 10 may be assigned a work or a role, and provide a service to a person, for example.

Dividing elements may be arranged in the path. The dividing element divides, for example, a group composed of a plurality of autonomous mobile objects 10 at regular time intervals. Specifically, such a group is divided at regular time intervals, and is a traffic light. The traffic lights are provided on crosswalks, railroad crossings, etc. Further, the dividing element divides the group for each accommodation space, for example. Specifically, the group is a technical means for transporting a part of the plurality of autonomous mobile objects 10, and more specifically, an elevator, a truck, or the like.

At the destination point, the plurality of autonomous mobile objects 10 may be stored. In addition, when the autonomous mobile object 10 includes a battery 17, which will be described later, at the destination point, the battery 17 may be replaced with a separate battery 17 having a large remaining amount. At the destination point, a plurality of separate autonomous mobile objects 10 may be parked. The plurality of separate autonomous mobile objects 10 may include a battery 17 having a larger remaining amount than the plurality of autonomous mobile objects 10. After the plurality of autonomous mobile objects 10 reach the destination point, if necessary, the plurality of separate autonomous mobile objects 10 that were parked may move to the departure point and replace the plurality of autonomous mobile objects 10.

The autonomous mobile object 10 is a robot used for a wide variety of applications, and is, for example, a transfer robot, a life support robot, and shared autonomous travel mobility. The control system 100 may comprise at least two autonomous mobile objects 10, for example, an example of the control system 100 shown in FIG. 2 comprises nine autonomous mobile objects 10.

As illustrated in FIG. 3, the autonomous mobile object 10 includes a communication unit 11, a control unit 12, a storage unit 14, and a sensor 15.

The communication unit 11 is a communication interface for performing wireless communication with the network 30. The communication unit 11 receives the route determined by the control device 20 via the network 30.

The control unit 12 controls various configurations of the autonomous mobile object 10. The control unit 12 includes a travel control unit 13. The travel control unit 13 autonomously moves the autonomous mobile object 10 along the route using the environmental data collected by the sensor 15. Here, it is assumed that the autonomous mobile object 10 acquires the position of the autonomous device by the sensor 15, the receiver 16 (described later in Global Positioning System (GPS), or the like.

The storage unit 14 may store the departure point 141, the destination point 142, the map information 143, and the dividing element information 144. The storage unit 14 may store the departure point 141, the destination point 142, the map information 143, the dividing element information 144, or a combination thereof in association with each other as appropriate. The storage unit 14 may acquire the departure point 141, the destination point 142, the map information 143, and the dividing element information 144 from the database 21 of the control device 20 illustrated in FIG. 4 via the communication unit 11. That is, the departure point 141, the destination point 142, the map information 143, and the dividing element information 144 may include the same contents as the departure point 211, the destination point 212, the map information 213, and the dividing element information 214, respectively.

The autonomous mobile object 10 may further include a sensor 15, a GPS receiver 16, and a battery 17 as appropriate. Further, the autonomous mobile object 10 may further include a configuration corresponding to the work and the role assigned at the departure point, specifically, an arm, a display, a speaker, a sound collector, and the like.

The sensor 15 collects environmental data around the autonomous mobile object 10 and outputs the collected environmental data to the travel control unit 13. The sensor 15 is, for example, a stereo camera, a radar, a Light Detection and Ranging, Laser Imaging Detection and Ranging, laser radar (LIDAR, or the like. GPS receiver 16 detects the present position of the device based on the signals from the satellites. The battery 17 has a predetermined remaining amount and supplies electric power to various components of the autonomous mobile object 10 as necessary. The battery 17 may be replaceable with a separate battery 17.

As illustrated in FIG. 4, the control device 20 includes a database 21, a control unit 22, and a communication unit 23.

The database 21 is a storage device such as a hard disk or a flash memory. In addition, the database 21 may include a volatile storage device such as Random Access Memory (RAM, which is a storage area for temporarily storing data.

The database 21 may include a departure point 211, a destination point 212, map information 213, dividing element information 214, and autonomous mobile object information 215. The database 21 may store the departure point 211, the destination point 212, the map information 213, the dividing element information 214, or a combination thereof in association with each other as appropriate. In the database 21, the departure point 211, the destination point 212, the map information 213, and the dividing element information 214 may be assigned in advance by an input operation or the like performed by the user.

The map information 213 is map data including a route. The route connects the departure point 211 and the destination point 212. The map information 213 may be, for example, data of a road map numbered with a node representing an intersection or the like and a link representing a passage. In addition, the map information 213 may include information on the height and width of the passage. The map information 213 may include information about buildings in the vicinity of the route.

The dividing element information 214 is information related to a dividing element, and the position of the dividing element and the configuration of the dividing element are, for example, information indicating a traffic light, a crosswalk, a trail, an elevator, a track, or the like. Further, the dividing element information 214 may include information indicating that the dividing element divides a group composed of a plurality of autonomous mobile objects 10 at regular time intervals or at each accommodation space. In addition, the dividing element information 214 may include a length of the fixed time interval or a size of the accommodation space. Also, the dividing element information 214 may include a passable duration for the autonomous mobile object 10 to pass through the dividing element, and a passable duration for the autonomous mobile object 10 not to pass through the dividing element.

The autonomous mobile object information 215 is information related to a plurality of autonomous mobile objects 10. The autonomous mobile object information 215 may include the number of the autonomous mobile objects 10, the shapes of the groups composed of the autonomous mobile objects 10, the positions of the autonomous mobile objects 10, the moving speeds, individual ID, the sizes, and the remaining amounts of the batteries 17. The size of the autonomous mobile object 10 is a width, a depth, a height, a shape, or the like.

The control unit 22 includes a dividing element identifying unit 221 and a movement control unit 222. The control unit 22 may further include a passable number calculating unit 223 and a storable number calculating unit 224.

The dividing element identifying unit 221 specifies the dividing element by using the dividing element information 214.

The movement control unit 222 controls the movement of the plurality of autonomous mobile objects 10 so as to reduce the waiting time for stopping at least one autonomous mobile object 10 followed by the dividing element in accordance with the dividing element specified by the dividing element identifying unit 221. Note that after the control system 100 receives the movement commands of the plurality of autonomous mobile objects 10, the movement control unit 222 may control the movement of the plurality of autonomous mobile objects 10. The movement command of the plurality of autonomous mobile objects 10 may be transmitted by the user or the control device 20, for example. For example, when the minimum value of the remaining amount of each battery 17 of the plurality of autonomous mobile objects 10 falls below a predetermined value, the control device 20 may transmit a movement command of the plurality of autonomous mobile objects 10. For example, the predetermined value may be set to such a size that the battery 17 is not completely discharged during movement of the plurality of autonomous mobile objects 10.

For example, the movement control unit 222 may cause at least one subsequent autonomous mobile object 10 to start autonomous movement from the departure point at a time point when the autonomous movement is started from the departure point to the at least one preceding autonomous mobile object 10 and at a time point when a predetermined period of time has elapsed. The predetermined period of time may be a sum of a passable duration in which one of the autonomous mobile objects 10 can pass through the dividing element and a non-passable duration in which the autonomous mobile object 10 cannot pass through the dividing element.

For example, the movement control unit 222 may set the number of autonomous mobile objects 10 constituting at least one preceding autonomous mobile object 10 and at least one succeeding autonomous mobile object 10 to be equal to or less than the number of autonomous mobile objects 10 that can pass the dividing element at once.

For example, the movement control unit 222 may set the number of autonomous mobile objects 10 constituting at least one preceding autonomous mobile object 10 and at least one succeeding autonomous mobile object to be equal to or less than the number of autonomous mobile objects 10 capable of accommodating the dividing element in the accommodation space at once.

For example, the movement control unit 222 may assign the plurality of autonomous mobile objects 10 from the group to at least one of the preceding autonomous mobile objects 10 in descending order of the remaining amount of the battery 17.

The control unit 22 may include a passable number calculating unit 223 when the dividing element divides the group at regular time intervals. In such a case, the passable number calculating unit 223 obtains the number of autonomous mobile objects 10 that can pass the dividing element at a time, based on the passable duration, the distance of the passing section in the dividing element, the moving speed of the autonomous mobile object 10, and the shape of the group. The passable duration is the time at which one of the autonomous mobile objects 10 can pass through the dividing element.

The control unit 22 may include a storable number calculating unit 224 when the dividing element divides the group into storage spaces. In such a case, the storable number calculating unit 224 obtains the number of autonomous mobile objects 10 in which the dividing elements can be stored in the storage space at once, based on the size of the storage space, the size of the autonomous mobile object 10, and the shape of the group.

The communication unit 23 is a communication interface with the network 30.

Example of Operation

Figure 5:
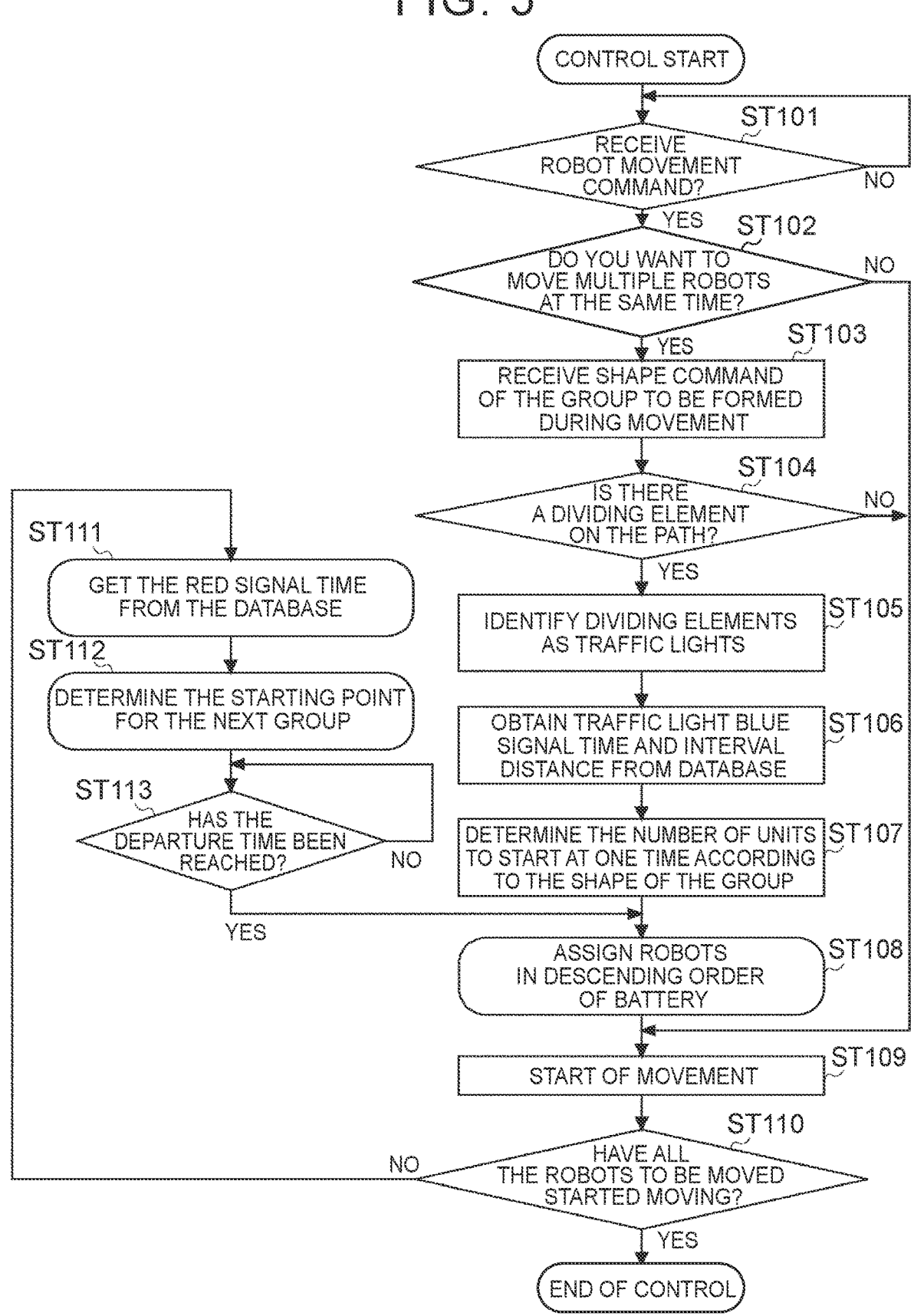
FIG. 5 is a flowchart illustrating an operation example of a control system for a plurality of autonomous mobile objects according to Embodiment 2.
Figure 6:
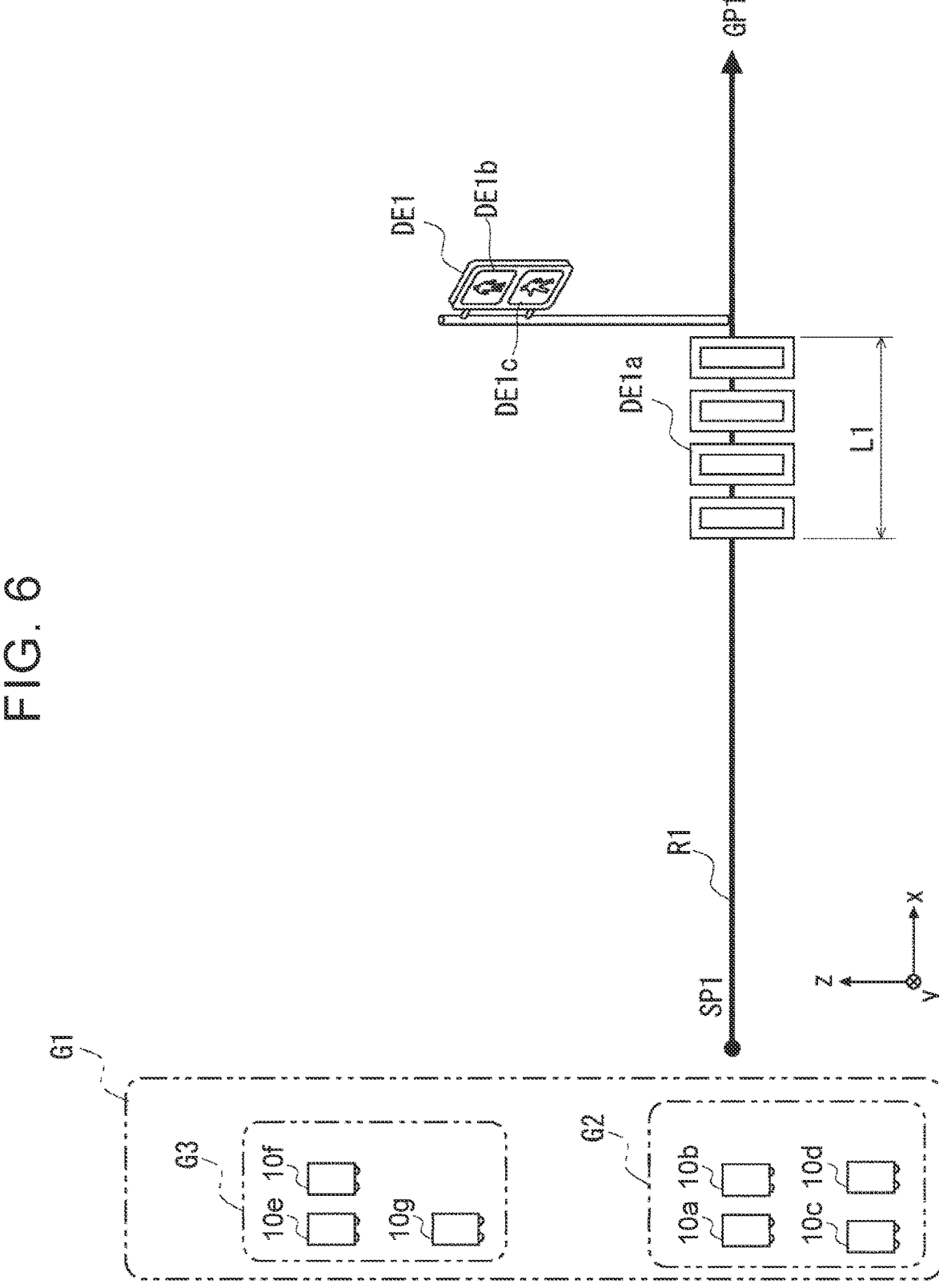
FIG. 6 is a schematic diagram illustrating an operation example of a control system for a plurality of autonomous mobile objects according to Embodiment 2.

With reference to FIG. 5 to FIG. 11, an operation example of a control system for a plurality of autonomous mobile objects according to Embodiment 2 will be described. In this example of operation, the control system 100 controls a robot 10a~10g, which is a specific example of the plurality of autonomous mobile objects 10, a total of seven robots. As illustrated in FIG. 6, the control system 100 controls the robotic 10a~10g to move from the departure point SP1 to the destination point GP1 along the route R1. The robotic 10a~10g constitutes a group G1. The robotic 10a~10g can autonomously move from the departure point SP1 to the destination point GP1 along the route R1 in the group G1. The route R1 is provided with a traffic light DE1, which is one embodiment of a dividing element. Specifically, the traffic light DE1 is provided on the crosswalk DE1a on the route R1. The crosswalk DE1a has a section distance L1 that is length in the route R1. The traffic light DE1 alternately lights the red signal DE1b and the blue signal DE1c. Note that an exemplary traffic light DE1 and crosswalk DE1a shown in FIG. 6 are shown schematically for clarity.

First, the control system 100 waits until it receives a command to move the robotic 10a~10g (step ST101: NO). The moving command of the robot 10a~10g is a command in which the robot 10a~10g moves from the departure point SP1 to the destination point GP1 along the route R1. As illustrated in FIG. 6, the control system 100 causes the robotic 10a~10g to wait at the departure point SP1.

Figure 11:
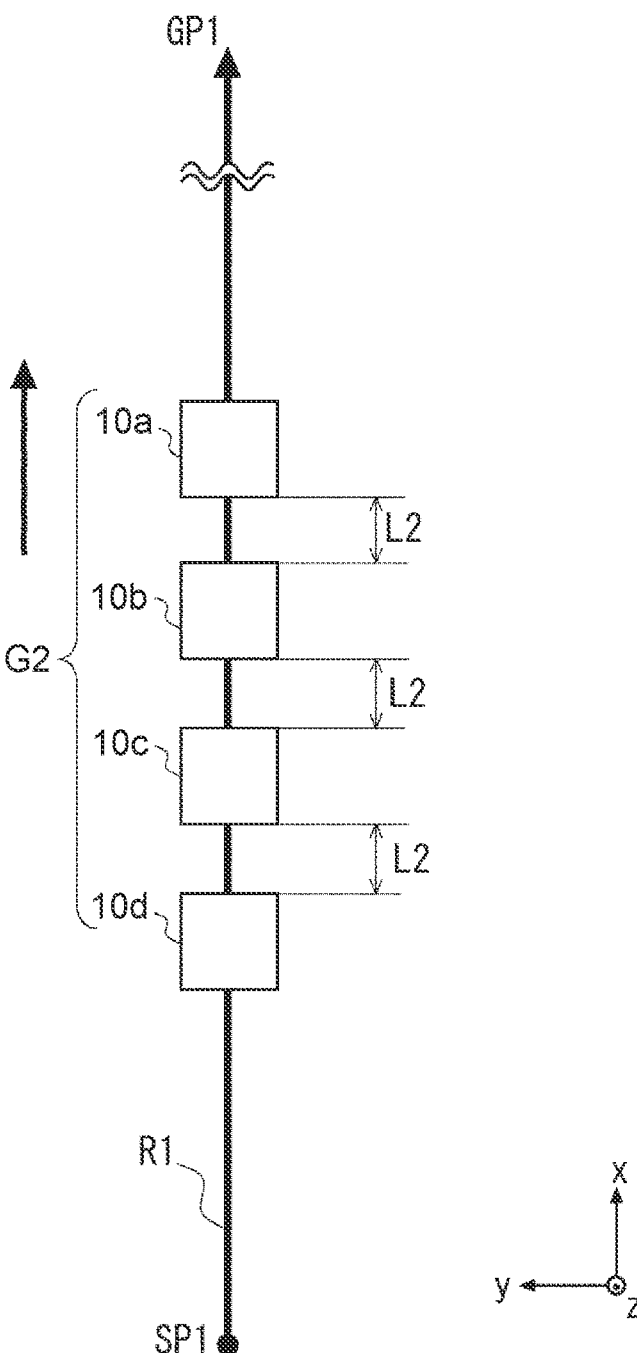
FIG. 11 is a diagram showing an example of the shape of a group of multiple autonomous mobile objects.
Figure 12:
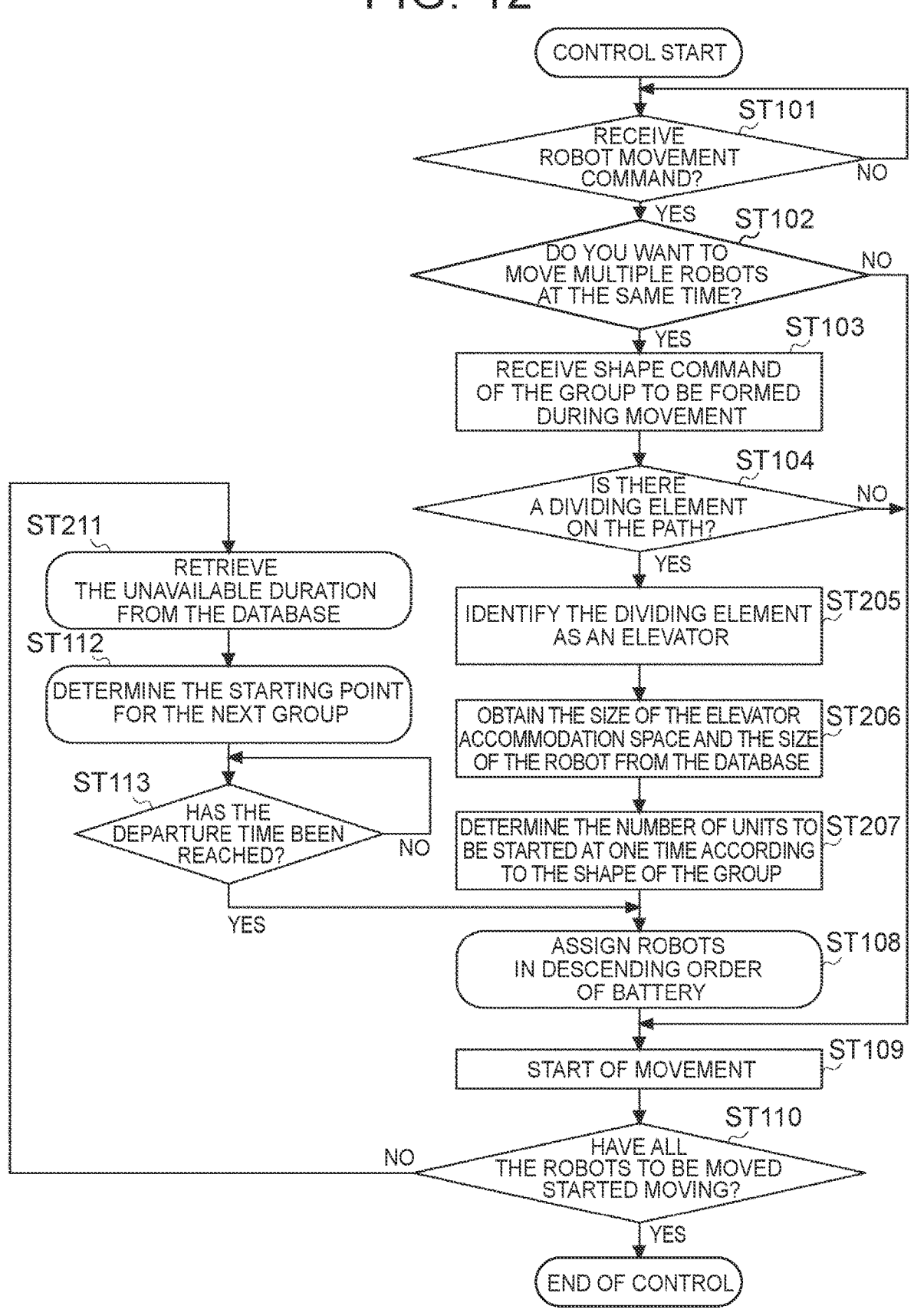
FIG. 12 is a flowchart illustrating another operation example of a control system for a plurality of autonomous mobile objects according to Embodiment 2.

When the control device 20 receives the movement command of the robot 10a~10g (step ST101: YES) and simultaneously moves the robot 10a~10g (step ST102: YES), the control device receives the shape command of the group G1 to be formed during the movement (step ST103). The shape of the group G1 is the arrangement of the robot 10a~10g in the group G1, and specifically, there is an arrangement in which the robot 10a~10g are arranged in one row or a plurality of rows along the route R1 at a distance from each other. More specifically, as shown in FIG. 11, an exemplary configuration of the preceding group G2 is an arrangement in which the robot 10a, the robot 10b, the robot 10c, and the robot 10d are arranged in a row along the route R1 at a distance L2 from each other.

Subsequently, it is determined whether the dividing element is disposed on the route R1 (step ST104). If it is determined that the dividing element is disposed on the route R1 (step ST104: YES), it is determined that the dividing element is a traffic light DE1 (step ST105). The dividing element identifying unit 221 illustrated in FIG. 4 specifies the dividing element based on the dividing element information 214 of the database 21. For example, as illustrated in FIG. 6, the dividing element identifying unit 221 specifies that the dividing element is a traffic light DE1.

Subsequently, the blue signal time Tb of the traffic light DE1 and the section distance L1 of the crosswalk DE1a are acquired from the database 21 (step ST106). The blue signal time Tb is the time for the traffic light DE1 to continuously turn on the blue signal DE1c, in other words, the time from the time when the blue signal DE1c starts to turn on after the red signal DE1b turns off to the time when it turns off. When the blue signal DE1c lights up, the robotic 10a~10g can pass through the crosswalk DE1a.

Subsequently, the passable number calculating unit 223 determines the number N of robot 10a~10g to be started at a time in accordance with the shape of the group G1, the blue signal time Tb, the moving velocity V of the robot 10a~10g, and the section distance L1 (step ST107). In the present case, the number of preceding group G2 to be started at one time was determined to be 4, and the number of subsequent group G3 to be started at one time subsequent to the preceding group G2 was determined to be 3.

In another embodiment, the blue signal time Tb is 1 minute (60 sec), the section distance L1 of the crosswalk DE1a is 10 m, and the moving velocities V of the plurality of autonomous mobile objects 10 are 1 m/sec. In addition, the configuration of the group is an arrangement in which a plurality of autonomous mobile objects 10 are arranged in a row along the route R1 at a distance L2 from each other. The distance L2 is 1 m. In this alternative example, the number N of autonomous mobile objects 10 to start at one time is determined to be 50 or less. This is because the first autonomous mobile object 10 passes through the traffic light DE1 over the crosswalk DE1a at a time point when 10 sec has elapsed since the blue signal time Tb started. This is because, after 50 sec has elapsed, a plurality of subsequent autonomous mobile objects 10 move in a 1 m/sec while being arranged in a row with a spacing 1 m therebetween until the time point at which the blue signal time Tb ends. In addition, when a plurality of autonomous mobile objects 10 are arranged in a row along the route R1 at a distance L2 from each other in the form of a group, the number N of the autonomous mobile objects 10 to be started at a time may be obtained by using Equation 1 below.

$$N=(Tb{\times}V{-}L1)/L2 \qquad \text{(Equation 1)}$$

Subsequently, the group G1 is allocated to the preceding group G2 in descending order of the remaining amount of the battery 17 (step ST108). The remaining amount of each battery 17 of the robot 10a~10d is smaller than the remaining amount of each battery 17 of the robot 10e~10g. Assign the robotic 10a~10d to the preceding group G2. The remaining robotic 10e~10g is assigned a subsequent group G3.

Figure 7:
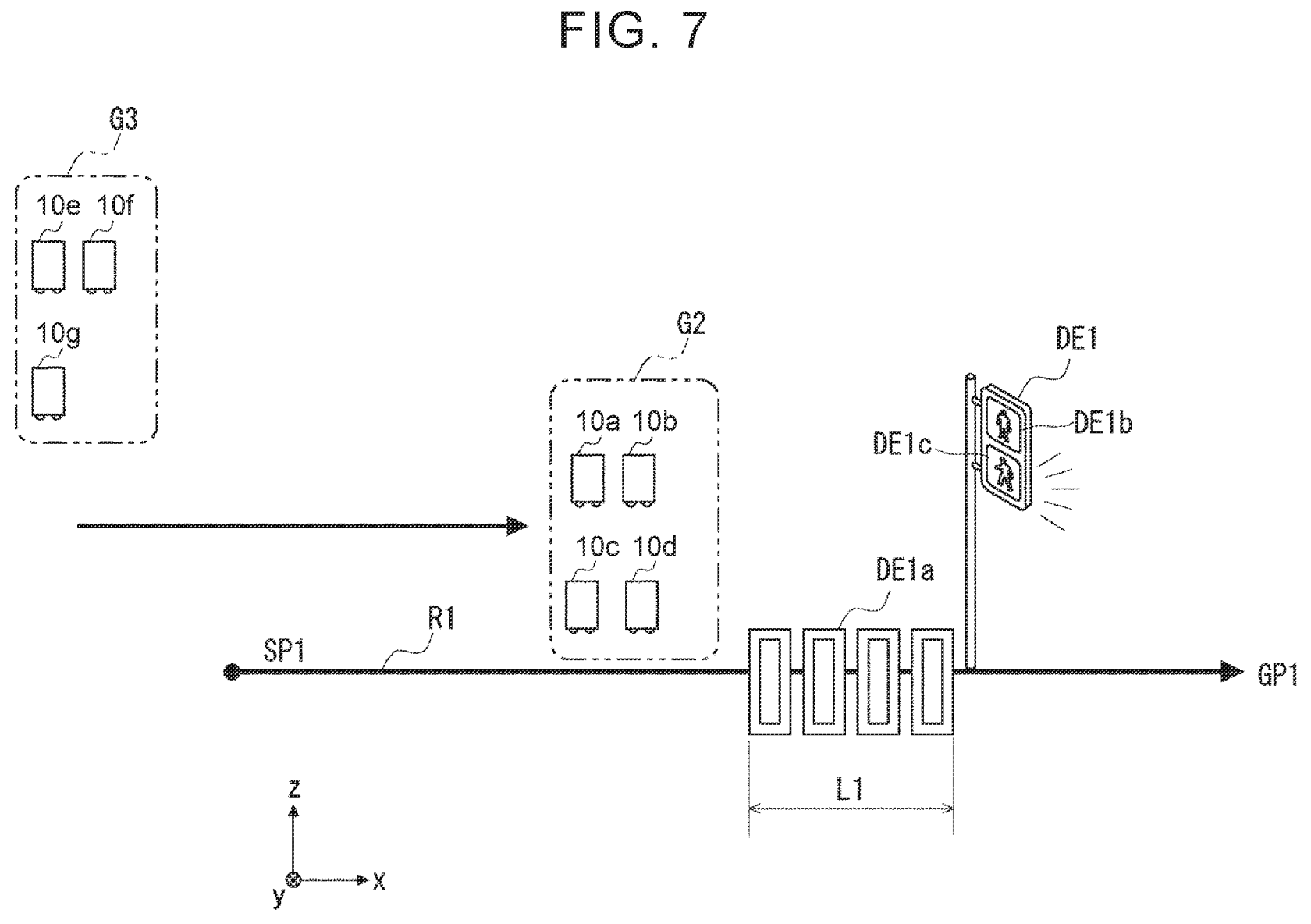

Subsequently, as shown in FIG. 7, the robotic 10a~10d as the preceding group G2 is started to move (step ST109).

Subsequently, the steps ST111 to ST113, step ST108, step ST109, and step ST110 are repeated until all the robotic 10a~10f to be moved starts moving (step ST110: NO).

A red signal time Tr is acquired from the database 21 shown in FIG. 4 (step ST111). The red signal time Tr is the time for the traffic light DE1 to continuously turn on the red signal DE1b, in other words, the time from the time when the red signal DE1b starts to turn on to the time when the red signal is turned off after the blue signal DE1c turns off. When the red signal DE1b lights up, the robotic 10a~10g cannot pass through the crosswalk DE1a.

Subsequently, the departure point at which the subsequent group G3 starts is determined (step ST112). The departure time point is a time point at which a predetermined time period has elapsed from the time point (step ST109) at which the autonomous travel is started from the departure point SP1 in the preceding group G2. The predetermined time period is, for example, the sum of the blue signal time Tb and the red signal time Tr. For example, when the blue signal time Tb and the red signal time Tr are 1 minute, the predetermined time period is 2 minutes.

Subsequently, when the departure point at which the subsequent group G3 starts is reached (step ST113: YES), the subsequent group G3 is similarly assigned in descending order of the remaining amount of the battery 17 among the group G1 remaining in the departure point SP1 (step ST108). In the present embodiment, the remaining amount of each battery 17 of the robot 10e~10g is smaller than the remaining amount of each battery 17 of the robot 10e~10g. Assign the robotic 10a~10d to the preceding group G2.

Subsequently, the moving of the robotic 10e~10g which is the subsequent group G3 is started (step ST109). The subsequent group G3 initiates autonomous travel from the departure point SP1 along the route R1 to the destination point GP1.

Figure 8:
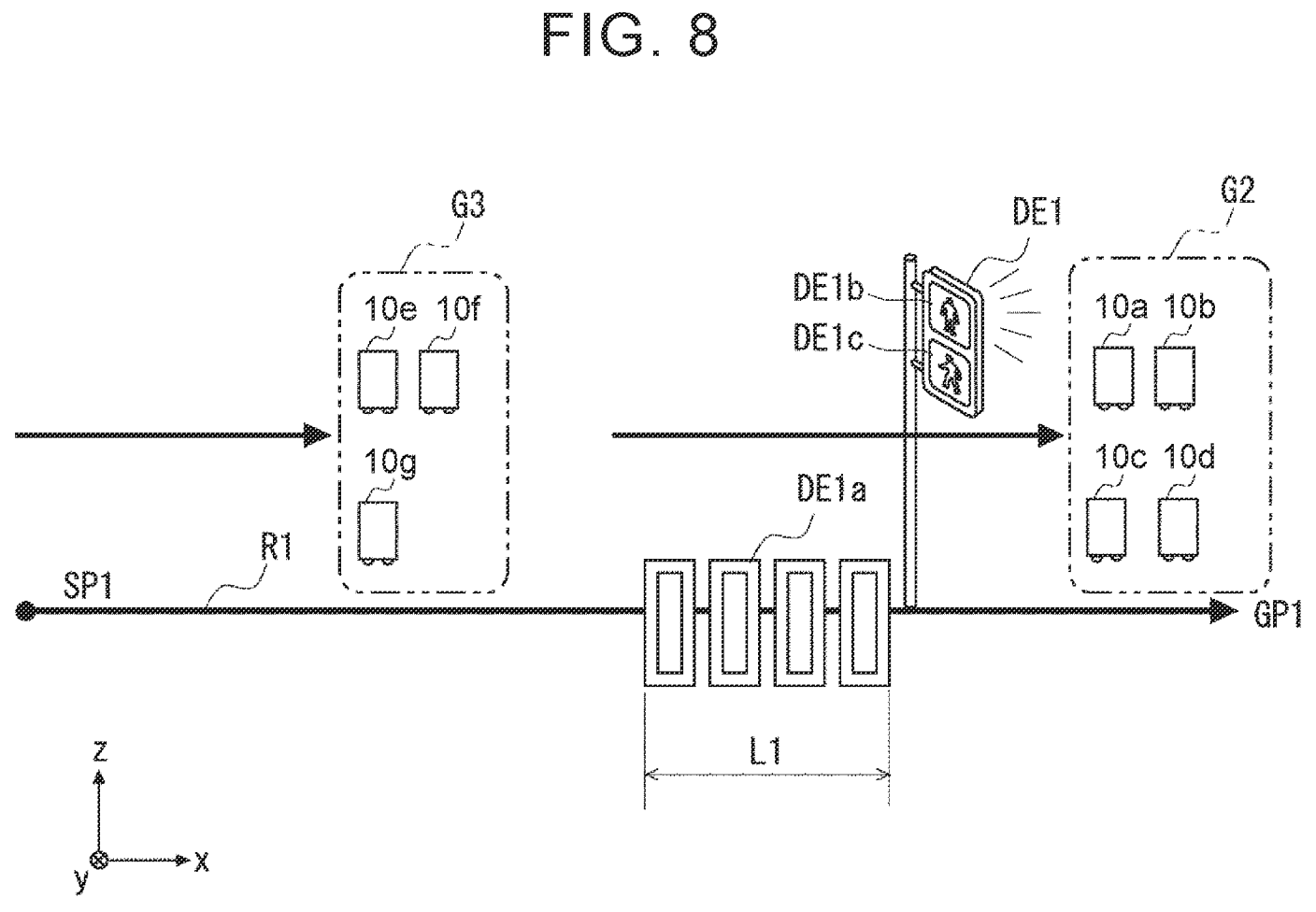

When the blue signal DE1c is on, the preceding group G2 passes through the traffic light DE1 while maintaining a predetermined travel velocity without stopping at the traffic light DE1. Thereafter, as shown in FIG. 8, the blue signal DE1c is turned off and the red signal DE1b is turned on. The preceding group G2 continues along the route R1 to the destination point GP1.

Figure 9:
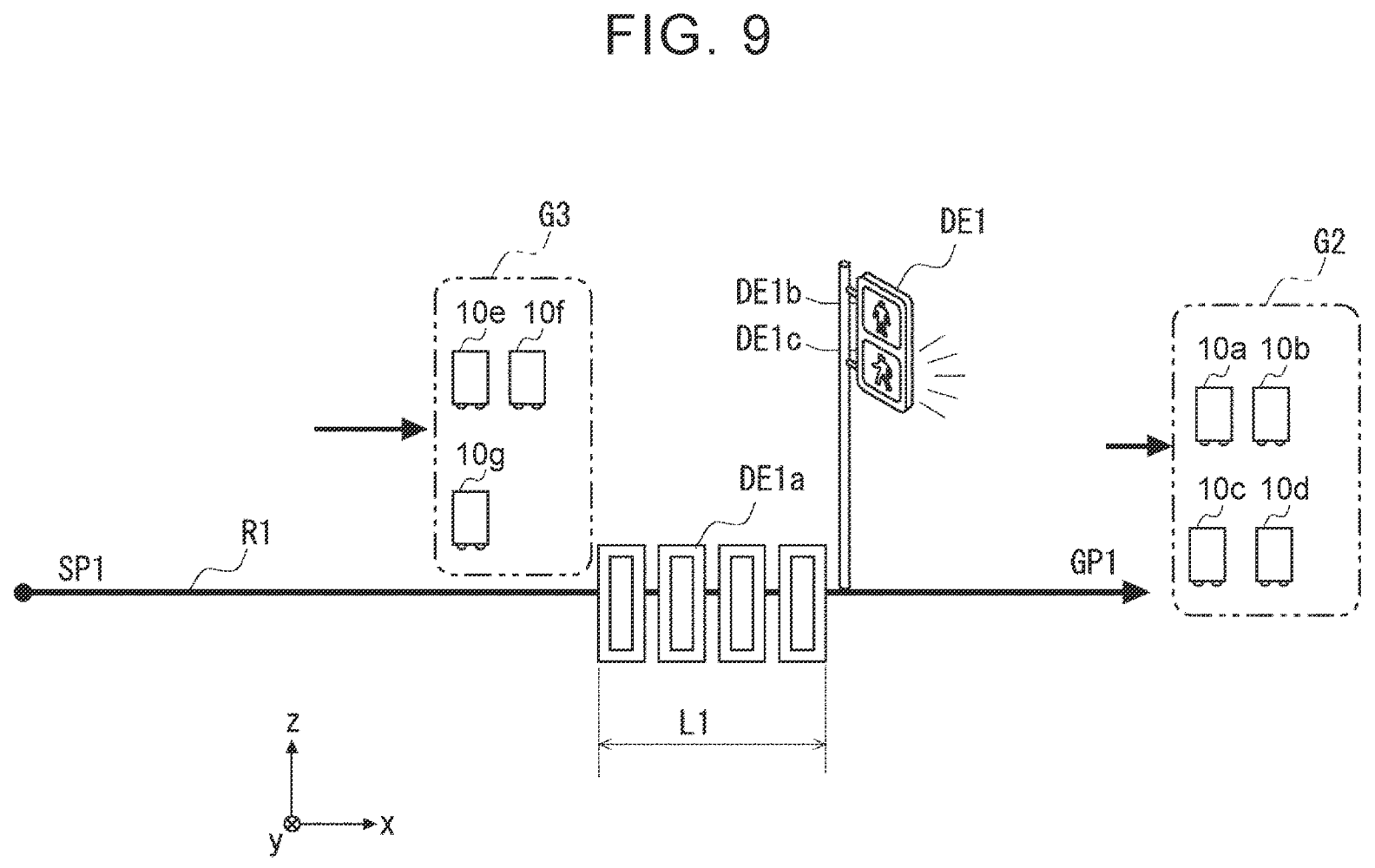

As shown in FIG. 9, the subsequent group G3 reaches the traffic light DE1. Then, the blue signal DE1c lights up and the red signal DE1b goes out. Note that the preceding group G2 reaches the destination point GP1.

Figure 10:
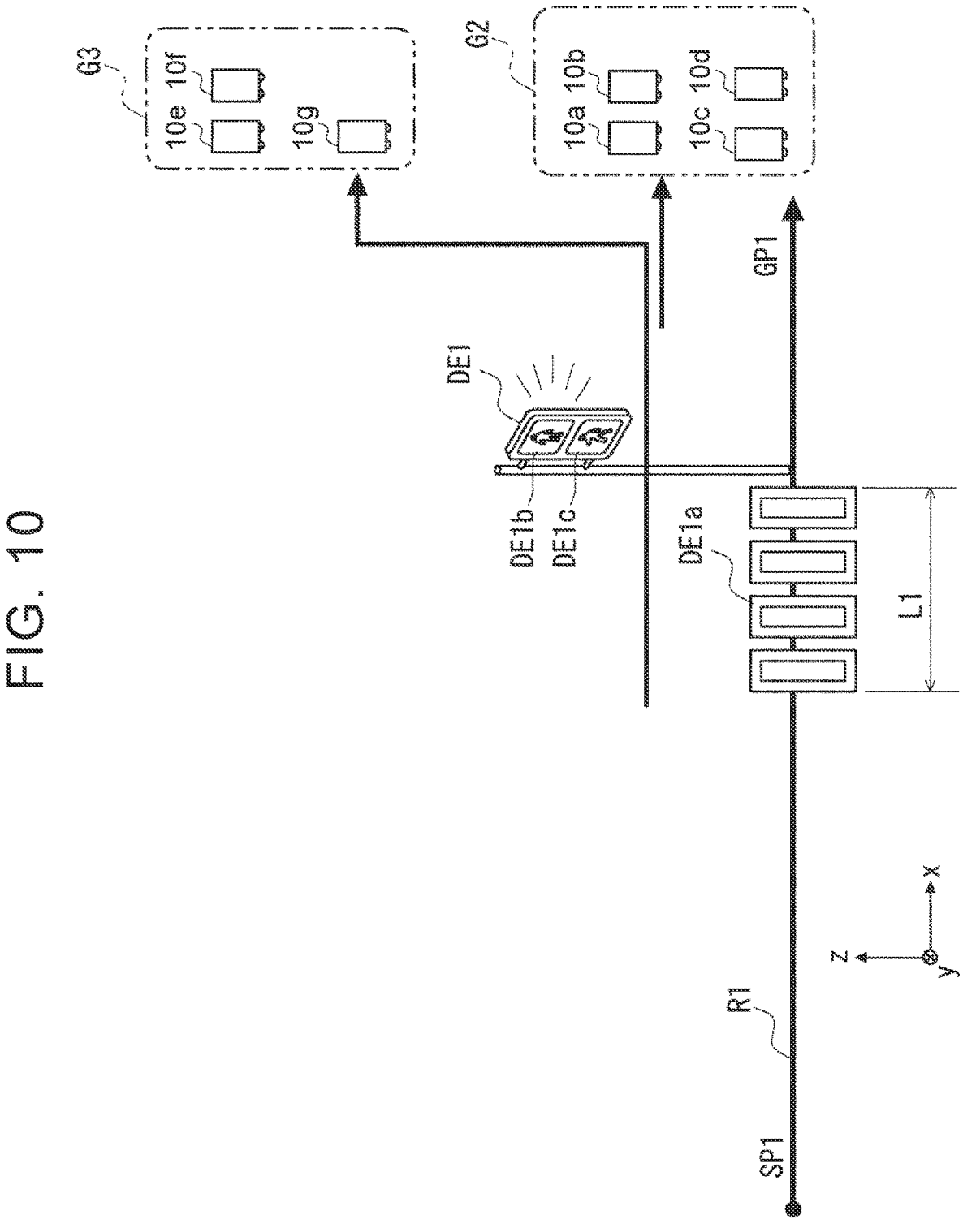
FIG. 10 is a schematic diagram illustrating an operation example of a control system for a plurality of autonomous mobile objects according to Embodiment 2.

Then, as shown in FIG. 10, the subsequent group G3 passes through the traffic light DE1 without stopping at the traffic light DE1, while maintaining a predetermined travel velocity. Further, the subsequent group G3 continues along the route R1 to the destination point GP1. Therefore, since the subsequent group G3 is hardly stopped by the traffic light DE1, there is hardly any waiting time. The subsequent group G3 reaches the destination point GP1 and merges with the preceding group G2. At the destination point GP1, the preceding group G2 and the subsequent group G3 merge to re-form a group G1.

When the control device 20 receives the movement command of the robot 10a~10g (step ST101: YES) and does not move the plurality of robots, that is, the robot 10a~10g at the same time (step ST102: NO), for example, when one robot is moved, the robot is started to move as it is (step ST109). When it is determined that the dividing element is not disposed on the route R1 (step ST104: NO), the robotic 10a~10g is started to move simultaneously as it is (step ST109). Further, all the robotic 10a~10g to be moved are started to move (step ST110: YES), and the control by the control system 100 ends.

As described above, according to the above-described configuration, the movement control unit 222 controls the movement of the robotic 10a~10g in accordance with the traffic light DE1 specified by the dividing element identifying unit 221, thereby reducing the waiting time of the subsequent group G3.

Further, according to the above-described configuration, the subsequent group G3 starts autonomously moving from the departure point SP1 after being delayed from the preceding group G2. Therefore, the latency of the subsequent group G3 is reduced.

Further, according to the above-described configuration, it is possible to determine the number N that constitutes the preceding group G2 and the subsequent group G3 based on the number of robots that can pass the traffic light DE1 which is an exemplary dividing element at once. Also, the preceding group G2 and the subsequent group G3 can each pass through the traffic light DE1 at one time. Further, it is possible to suppress the batteries 17 of the respective robotic 10a~10g of the preceding group G2 and the subsequent group G3 from being completely discharged. Each robotic 10a~10g of the preceding group G2 and the subsequent group G3 can perform stable autonomous movements by suppressing complete discharging of each battery 17. In addition, the subsequent group G3 can pass through the traffic light DE1 with little stoppage. There is almost no waiting time for robotic 10e~10g.

In addition, when the destination point GP1 is a replacement location of the battery 17, it may be possible to return to the destination point GP1 while maintaining a higher operation rate by reducing the waiting time of the robotic 10a~10g. In addition, instead of the autonomous mobile object 10 returning to the destination point GP1, a separate robotic 10a~10g having a large remaining battery 17 may be autonomously moved from the destination point GP1 to the departure point SP1. By autonomously moving a separate robotic 10a~10g having a large amount of remaining battery 17 to the departure point, the autonomous mobile object 10 returning to the destination point GP1 and the departure point SP1 can be replaced.

In addition, since the latency is reduced, the subsequent group G3 can delay the time of departure by a period equal to or less than the latency to extend the period of work and roles in the departure point SP1. Further, since the waiting time is reduced, the subsequent group G3 can suppress a reduction in the remaining capacity of the battery 17. Further, since the waiting time is reduced, it is possible to suppress interference to humans caused by the subsequent group G3 blocking the traffic light DE1 or the vicinity thereof.

Another Operation Example

Figure 13:
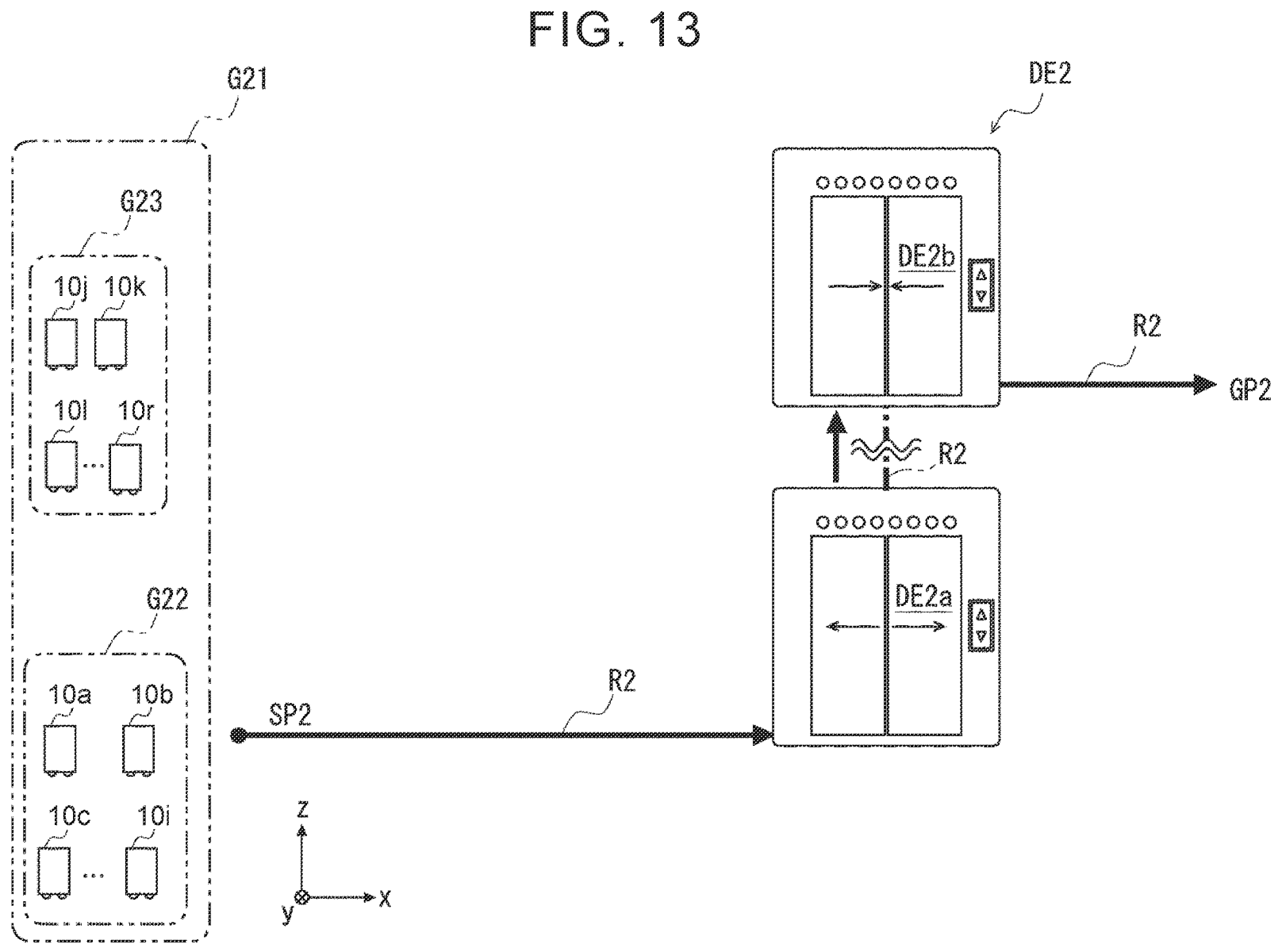

With reference to FIGS. 12 to 18, another operation example of the control system for a plurality of autonomous mobile objects according to the second embodiment will be described. In this example of operation, the control system 100 controls a robot 10a~10r, which is a specific example of the plurality of autonomous mobile objects 10, and a total of 18 robots. As illustrated in FIG. 13, the control system 100 controls the robotic 10a~10r to move from the departure point SP2 to the destination point GP2 along the route R2. The robotic 10a~10r constitutes a group G21. The robotic 10a~10r can autonomously move from the departure point SP2 to the destination point GP2 along the route R2 in the group G21. The route R2 is provided with an elevator DE2, which is one embodiment of a dividing element. The elevator DE2 may include an accommodation space DE2c (see FIG. 18) for accommodating a predetermined number of robots. The accommodation space DE2c is an inner space of the car of the elevator DE2. The elevator DE2 opens the door DE2a at a predetermined floor to accommodate the robotics. The elevator DE2 closes the door DE2a and then transports the robot to another floor while the robot is accommodated.

The elevator DE2 opens the door DE2a at another floor to open the robots to the destination point GP2 in the route R2.

As described above, as in one operation example of a control system of the autonomous mobile objects according to the embodiment 2 shown in FIG. 5, the step ST101~step ST104 is performed. For example, the control system 100 waits until a moving command of the robotic 10a~10r is received (step ST101: NO).

If it is determined that the dividing element is disposed on the route R2 (step ST104: YES), it is determined that the dividing element is an elevator DE2 (step ST205). As illustrated in FIG. 13, the dividing element identifying unit 221 specifies that the dividing element is an elevator DE2.

The size of the accommodation space DE2c of the elevator DE2 and the size of the robotic 10a~10r are acquired from the database 21 shown in FIG. 4 (step ST206). Specifically, the size of the accommodation space DE2c of the elevator DE2 is a width, a depth, and a height of the accommodation space DE2c of the elevator DE2. Specifically, the size of the robot 10a~10r is the width, depth, and height of the robot 10a~10r.

Subsequently, the storable number calculating unit 224 determines the number N of robot 10a— 10r to be started at a time in accordance with the shapes of the group G21, the size of the accommodation space DE2c of the elevator DE2, and the size of the robot 10a~10r (step ST207). For example, the height of the accommodation space DE2c of the elevator DE2 is larger than the height of the robotic 10a~10r. Further, an exemplary accommodation space DE2c of the elevator DE2 illustrated in FIG. 18 has a square bottom surface DE2d. One side of the square has a length L2b. In addition, the width and depth of the robotic 10a~10r are substantially the same as the length L21b. The length L2b is the same length as five times the length L21b. Here, in the bottom surface DE2d, when the robot 10a~10r are arranged at length L21b from each other, a total of nine robots, for example, robot 10a~10i, can be arranged. That is, the accommodation space DE2c of the elevator DE2 can accommodate up to nine robots. Thus, nine robots can be started at a time.

Subsequently, the step ST108 and the step ST109 are performed in the same manner as in the above-described exemplary operation of the control system of the plurality of autonomous mobile objects according to the second embodiment shown in FIG. 5. That is, a part of the robotic 10a~10r in the group G21 is allocated to the preceding group G22 in descending order of the remaining amount of the battery 17 (step ST108). The remaining amount of each battery 17 of the robot 10a~10i is smaller than the remaining amount of each battery 17 of the robot 10j~10r. Assign the robotic 10a~10i to the preceding group G22. The remaining robotic 10j~10r is assigned to the subsequent group G23.

Figure 14:
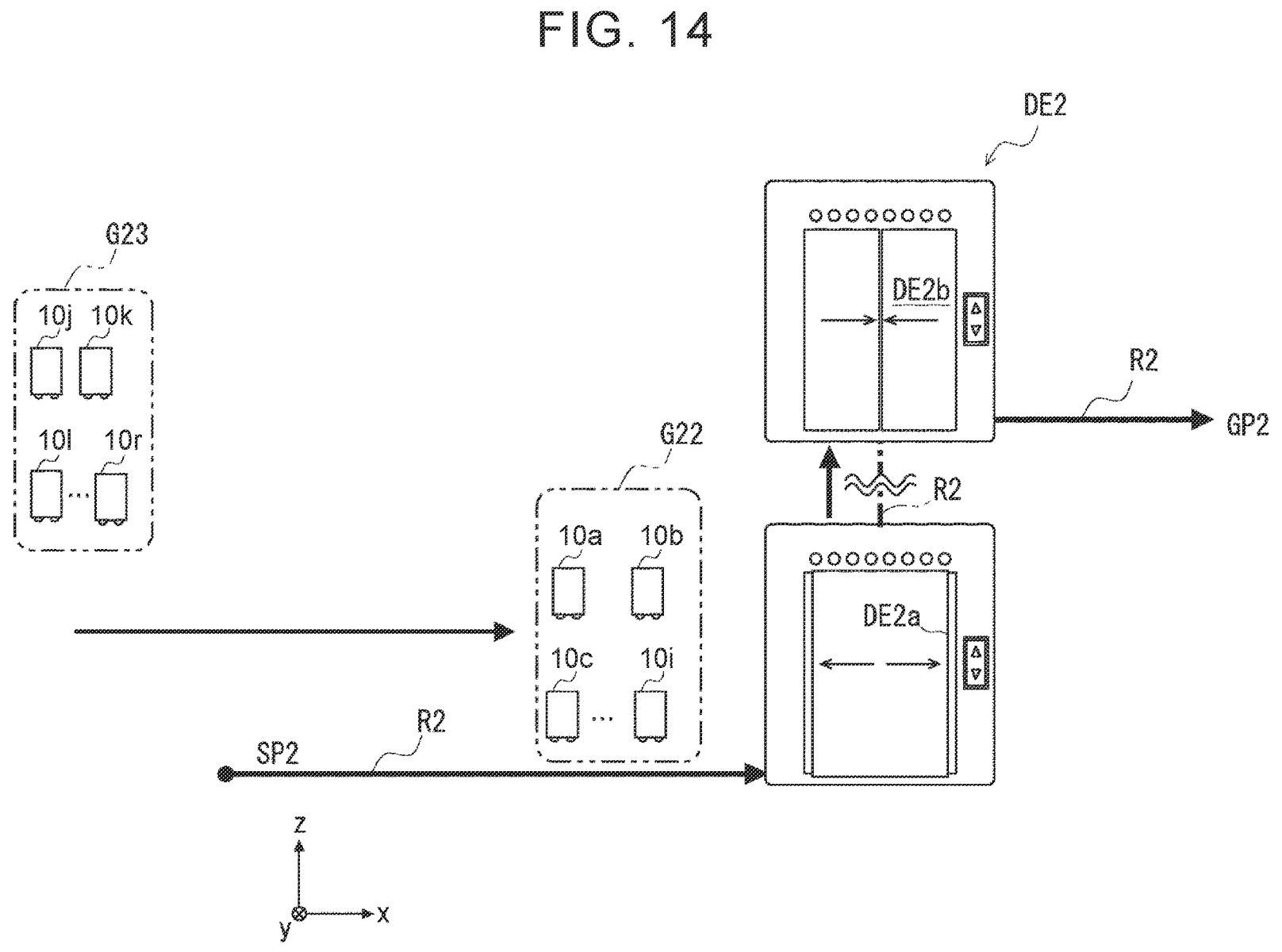

Subsequently, as shown in FIG. 14, the robotic 10a~10i as the preceding group G22 is started to move (step ST109).

Subsequently, the steps ST211, step ST112, step ST113, step ST108, step ST109, and step ST110 are repeated until all the robotic 10a~10r to be moved begin to move (step ST110: NO).

The non-transit duration Tn is obtained from the database 21 (step ST211). The non-transit duration Tn is a duration from the time when the elevator DE2 closes the door DE2a on the predetermined floor to the time when the door DE2a is opened after the robot is accommodated. Specifically, in the non-transit duration Tn, the elevator DE2 closes the door DE2a to convey the robotic 10a~10r from a predetermined floor to another floor. Subsequently, the elevator DE2 opens the door DE2b on another floor to open the robotic 10a~10r to the destination point GP2 in the route R2. Subsequently, after the robotic 10a~10r passes through the door DE2b, the elevator DE2 closes the door DE2b and returns from another floor to a predetermined floor. The elevator DE2 opens the door DE2a. In the non-transit duration Tn, the other robots cannot pass through the door DE2a of the elevator DE2.

Subsequently, the departure point at which the subsequent group G23 starts is determined (step ST112). The departure time point is a time point at which a predetermined time period has elapsed from the time point (step ST109) at which the autonomous travel is started from the departure point in the preceding group G22. The predetermined duration is, for example, a non-transit duration Tn.

The steps ST113, the steps ST108, and the steps ST109 are performed in the same manner as in the above-described exemplary operation of the control system of the plurality of autonomous mobile objects according to the second embodiment illustrated in FIG. 5. The subsequent group G23 initiates autonomous travel from the departure point SP2 along the route R2 to the destination point GP2.

Figure 15:
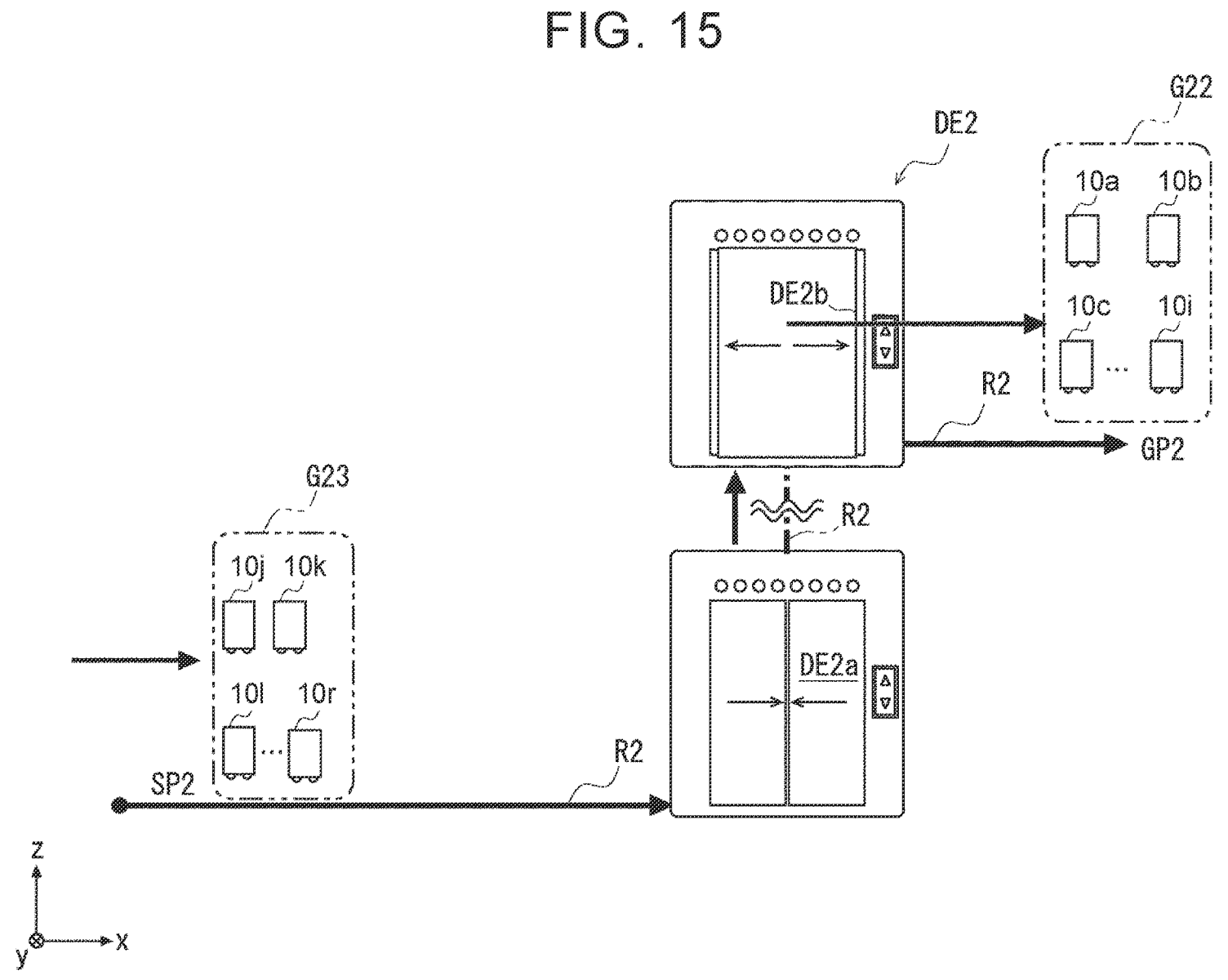

As shown in FIG. 14, when the door DE2a is open, the preceding group G22 enters the elevator DE2 while maintaining a predetermined travel velocity without stopping at the door DE2a. Thereafter, as shown in FIG. 15, the door DE2a closes, and the elevator DE2 transports the preceding group G22 from a predetermined floor to another floor. Further, after the door DE2b is opened, the preceding group G22 continues along the route R2 to the destination point GP2.

Figure 16:
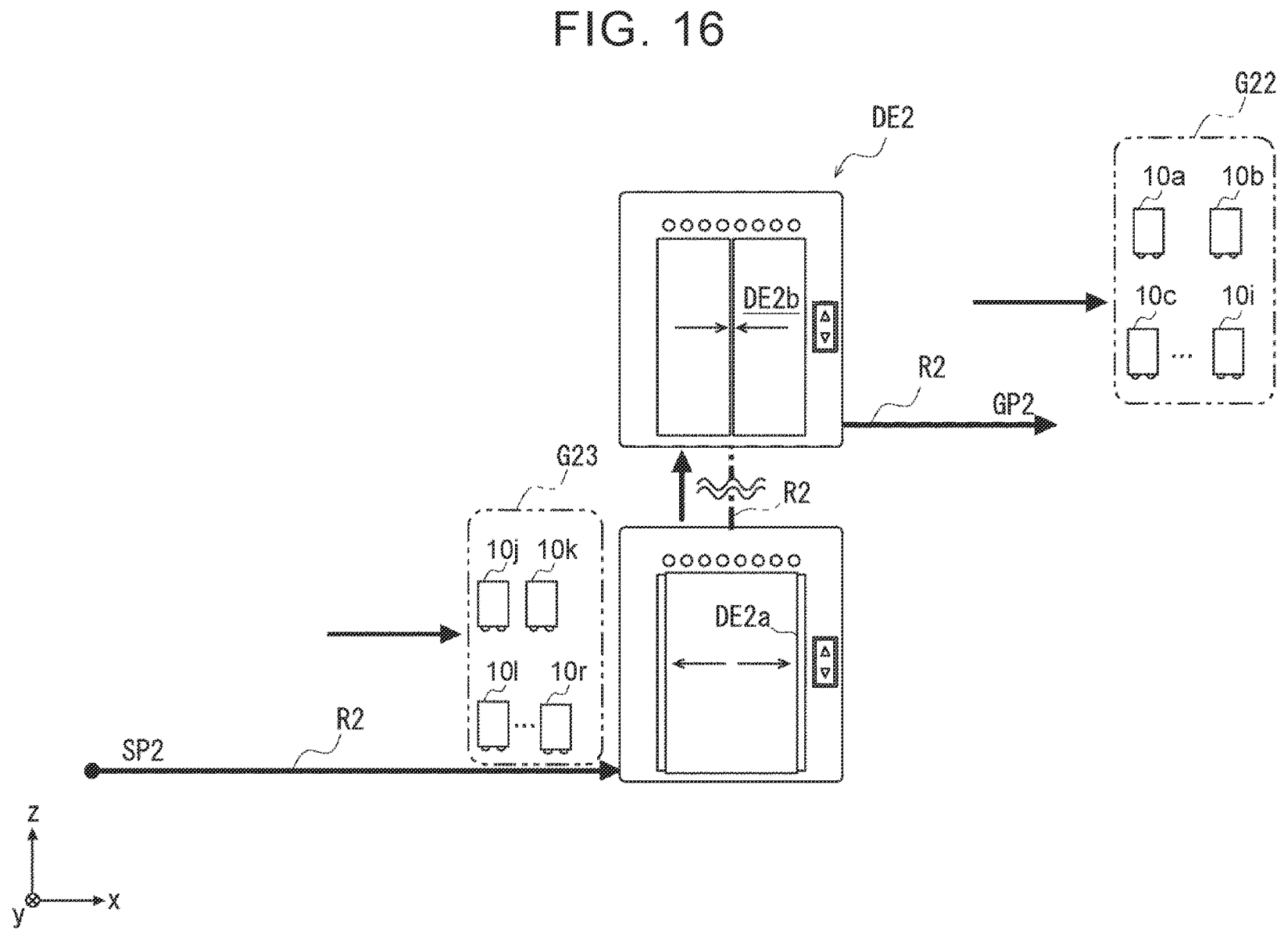

As shown in FIG. 16, the subsequent group G23 reaches the door DE2a. Then, DE2a opens. Note that the preceding group G22 reaches the destination point GP2.

Figure 17:
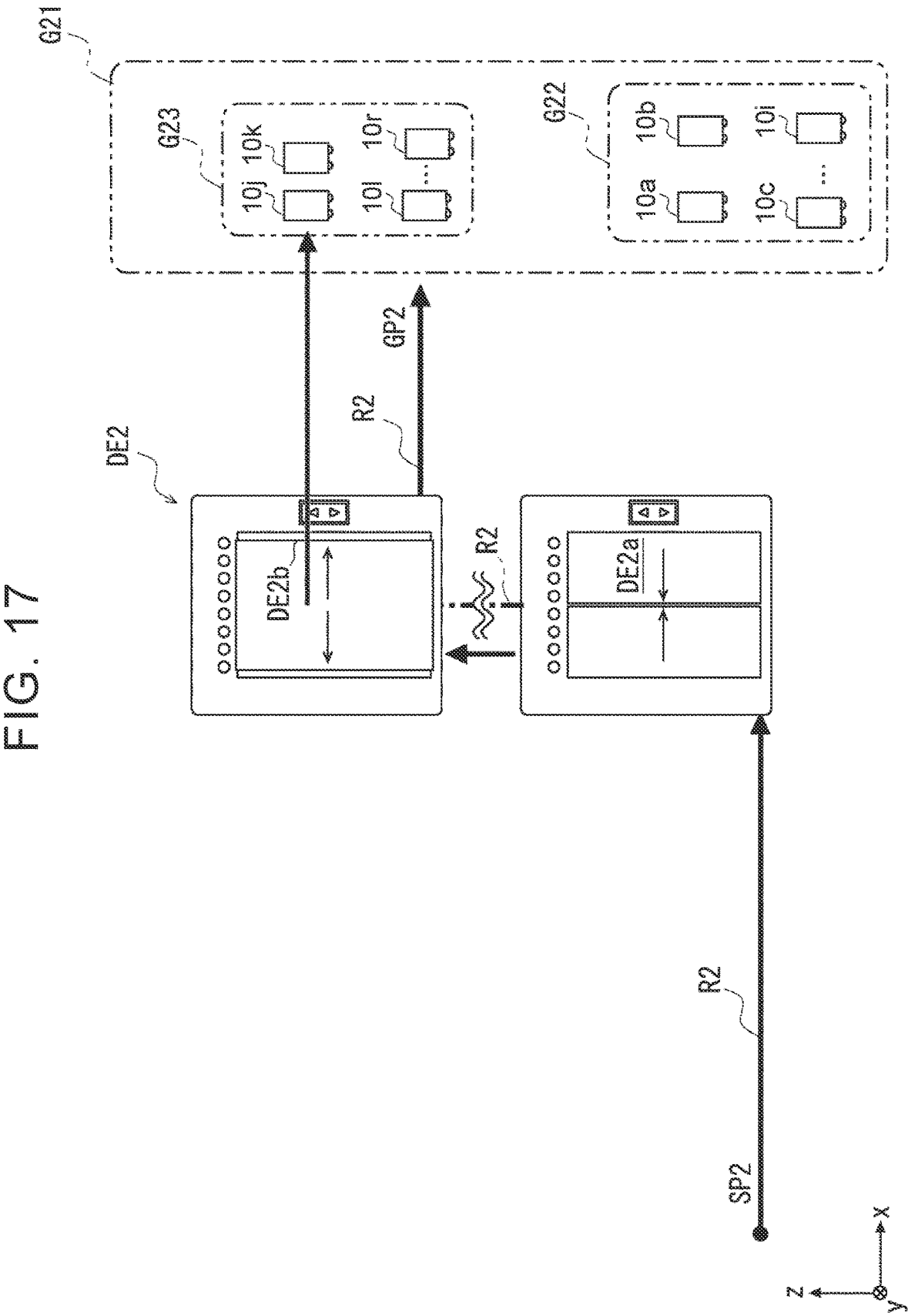
FIG. 17 is a schematic diagram illustrating another operation example of a control system for a plurality of autonomous mobile objects according to Embodiment 2.
Figure 18:
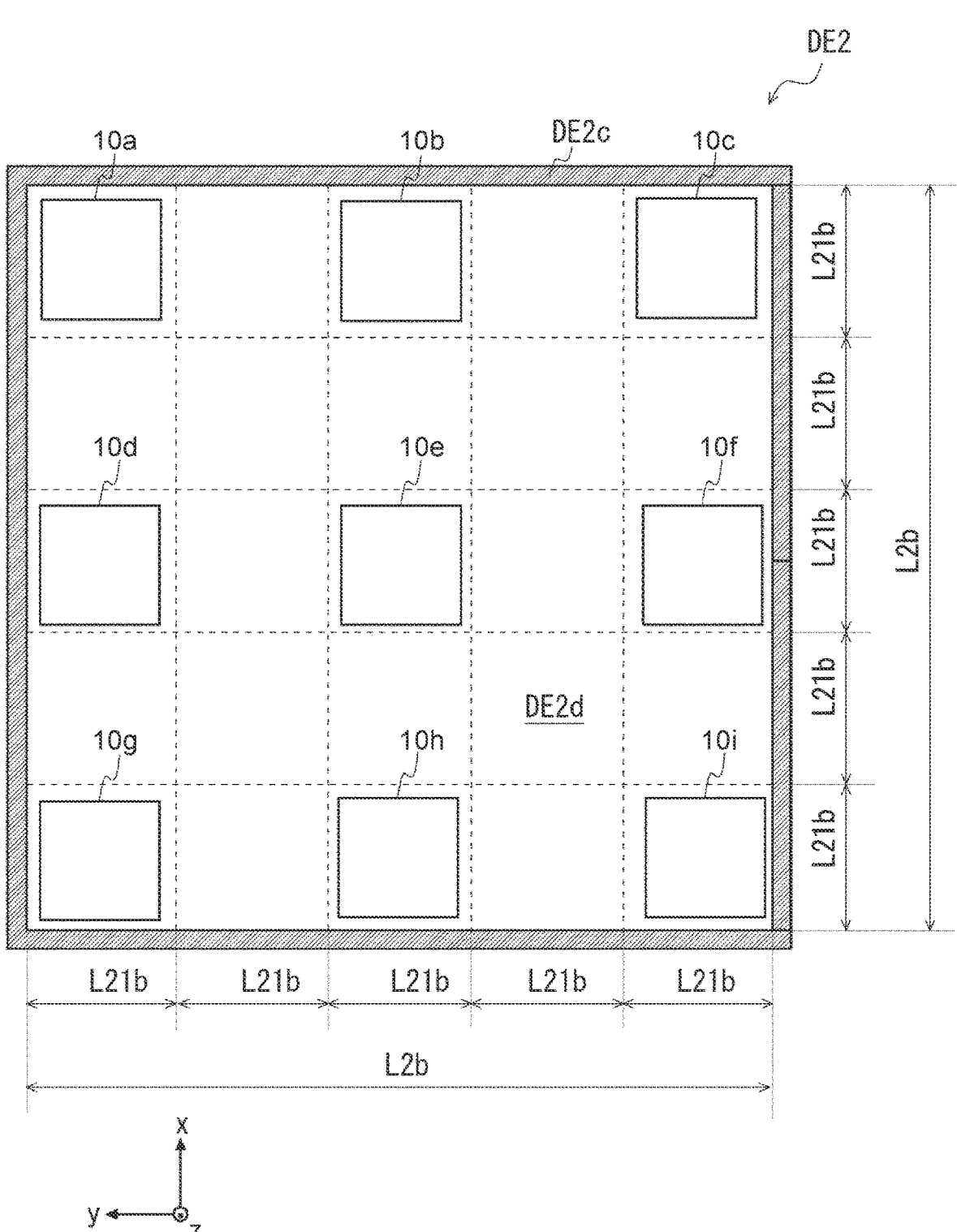
FIG. 18 is a schematic diagram illustrating an example of a plurality of autonomous mobile objects accommodated in the accommodation space.

Then, as shown in FIG. 17, the subsequent group G23 enters the elevator DE2 while maintaining a predetermined travel velocity without stopping at the door DE2a. Further, the subsequent group G23 is transported by the elevator DE2 from a predetermined floor to another floor. Subsequently, the subsequent group G23 proceeds from the door DE2b to the destination point GP2 along the route R2. Therefore, since the subsequent group G23 is hardly stopped by the elevator DE2, there is hardly any waiting time. The subsequent group G23 reaches the destination point GP2 and merges with the preceding group G22. At the destination point GP1, the preceding group G22 and the subsequent group G23 merge to re-form a group G21.

When the robotic 10a~10r is not moved at the same time (step ST102: NO) or when it is determined that the dividing element is not arranged on the route R2 (step ST104: NO), the operation is the same as the operation of the control system of the plurality of autonomous mobile objects according to the second embodiment shown in FIG. 5. In these cases, control by the control system 100 is terminated through the step ST109 and the step ST110 in a similar manner.

As described above, according to the above-described configuration, the movement control unit 222 controls the movement of the robotic 10a~10r in accordance with the elevator DE2 specified by the dividing element identifying unit 221, thereby reducing the waiting time of the subsequent group G23.

Further, based on the number of robot 10a~10r that can be accommodated in the accommodation space DE2c of the elevator DE2 at once, the number of robot 10a~10r that constitute the preceding group G22 and the subsequent group G23 can be determined.

The elevator DE2 also houses the preceding group G22 and the subsequent group G23 at a time. Therefore, the preceding group G22 and the subsequent group G23 can be smoothly passed through the elevator DE2 without being divided.

OTHER EMBODIMENTS, ETC

Figure 19:
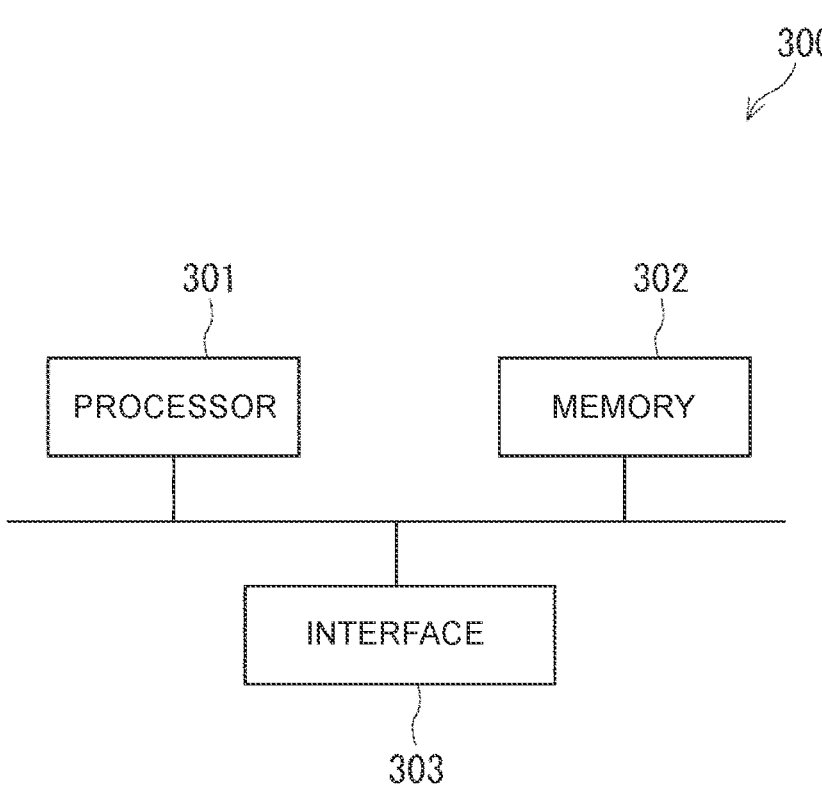
FIG. 19 is an exemplary configuration included in a control system of a plurality of autonomous mobile objects.

Note that the control system according to the above-described embodiment can have the following hardware configuration. FIG. 19 is a configuration example included in a control system of a plurality of autonomous mobile objects.

In the various embodiments described above, as the procedure of the processing in the control system has been described, the present disclosure may also take the form of a processing method.

The control device 300 illustrated in FIG. 19 includes a processor 301 and a memory 302 together with an interface 303. The configuration (see FIG. 4) of the control unit 22 described in the above-described embodiment is realized by the processor 301 reading and executing a program stored in the memory 302. That is, the program is a control program for causing the processor 301 to function as the control system 100, 200, or a part thereof.

The programs described above include instructions (or software code) that, when loaded into a computer, cause the computer to perform one or more of the functions described in the embodiments. The program may be stored in a non-transitory computer-readable medium or a tangible storage medium. By way of example, and not limitation, computer-readable media or tangible storage media include random-access memory (RAM), read-only memory (ROM), flash memory, solid-state drive (SSD) or other memory techniques, CD-ROM, digital versatile disc (DVD), Blu-ray disk or other optical disk storage, magnetic cassettes, magnetic tape, magnetic disk storage or other magnetic storage devices. The program may be transmitted on a transitory computer-readable medium or a communication medium. The example of the transitory computer-readable medium or the communication medium include, but is not limited to, an electrical, optical, acoustic, or other form of propagating signal.

Further, in the various embodiments described above, as the procedure of the processing in the control system 100 and the control system 200 is described, the present disclosure may also take the form of a control system 100 and a control method of the control system 200. Further, the above-described program can be said to be a control program for causing the control system 100 and the control system 200 to execute such a control method.

The present disclosure is not limited to the above embodiment, and can be appropriately modified without departing from the spirit. In addition, the present disclosure may be implemented by appropriately combining the above-described embodiments and one example thereof. For example, an example of the preceding group G2 illustrated in FIG. 6 includes a robot 10$a$~10$d$ that is a specific example of the plurality of autonomous mobile objects 10, in other words, a total of four robots, but may include at least one autonomous mobile object 10. Similarly, an example of the subsequent group G3 illustrated in FIG. 6 includes a robot 10$e$~10$g$ that is an example of the plurality of autonomous mobile objects 10, in other words, a total of three robots, but may include at least one autonomous mobile object 10. Similarly, the preceding group G22 and the subsequent group G23 shown in FIG. 13 may each be composed of at least one autonomous mobile object 10.

What is claimed is:

1. A control system comprising a processor configured to:
   control a plurality of autonomous mobile objects that are configured to autonomously move in a group from a departure point to a destination point along a route;
   allocate each of the autonomous mobile objects to either a first group or a second group;
   identify a traffic light on the route, the traffic light being in either a green state or a red state, the green state continuing for a first time period and the red state continuing for a second time period;
   depart the first group from the departure point;
   determine whether a predetermined time period has elapsed after the first group has departed from the departure point, the predetermined time period being a sum of the first time period and the second time period; and
   in a case where the predetermined time period has elapsed after the first group has departed from the departure point, depart the second group from the departure point, wherein
   in a case where the traffic light is in the green state, the autonomous mobile objects pass through the traffic light, and
   in a case where the traffic light is in the red state, the autonomous mobile objects stop at the traffic light.

2. The control system according to claim 1, wherein the processor is configured to calculate a number of the autonomous mobile objects that are able to pass through the traffic light at once during the first time period, based on a length of the first time period, a distance of a passing section in the traffic light, a moving speed of the autonomous mobile object, and a shape of the group.

3. The control system according to claim 2, wherein the processor is configured to allocate the autonomous mobile objects to either the first group or the second group such that a number of the autonomous mobile objects in both the first group and the second group is equal to or less than the number of the autonomous mobile objects that are able to pass through the traffic light at once during the first time period.

4. The control system according to claim 1,
   wherein the traffic light includes a space that is configured to store the autonomous mobile objects, and
   the processor is configured to calculate a number of the autonomous mobile objects that are able to be stored in the space, based on a size of the space, a size of each of the autonomous mobile objects that fits into the space, and a shape of the group.

5. The control system according to claim 4, wherein the processor is configured to allocate the autonomous mobile objects to either the first group or the second group such that a number of the autonomous mobile objects in both the first group and the second group is equal to or less than the number of the autonomous mobile objects that the traffic light is able to store in the space.

6. The control system according to claim 1, wherein the processor is configured to allocate the autonomous mobile objects to the first group in an order in which a remaining amount of a battery is low.

7. The control system according to claim 1, wherein the processor is configured to move the second group directly and uninterruptedly from the departure point to the destination point without stopping the second group on the route that includes the traffic light.

8. The control system according to claim 7, wherein
   the number of the plurality of the autonomous mobile objects is seven, and the processor is configured to allocate four of the plurality of the autonomous mobile objects to the first group and three of the plurality of the autonomous mobile objects to the second group.

9. The control system according to claim 8, wherein a remaining amount of each battery of the autonomous mobile objects in the first group is smaller than a remaining amount of each battery of the autonomous mobile objects in the second group.

10. The control system according to claim 1, wherein the number of the plurality of the autonomous mobile objects is seven, and
the processor is configured to allocate four of the plurality of the autonomous mobile objects to the first group and three of the plurality of the autonomous mobile objects to the second group.

11. The control system according to claim 10, wherein a remaining amount of each battery in the autonomous mobile objects in the first group is smaller than a remaining amount of each battery in the autonomous mobile objects in the second group.

12. The control system according to claim 1, wherein:
the processor is configured to calculate the predetermined time period such that the second group arrives at the traffic light at a time when the traffic light changes from the red state to the green state.

13. The control system according to claim 1, wherein:
the processor is further configured to
calculate a maximum number of autonomous mobile objects that can pass through the traffic light during the green state based on a duration of the green state, a velocity of the autonomous mobile objects, and a distance of a passing section at the traffic light, and
allocate the autonomous mobile objects to the first group and the second group such that each group has no more than the calculated maximum number.

* * * * *